United States Patent
Kaifuku et al.

(10) Patent No.: US 10,753,472 B2
(45) Date of Patent: Aug. 25, 2020

(54) CONTROL DEVICE FOR VEHICLE DRIVING DEVICE

(71) Applicant: AISIN AW CO., LTD., Anjo-shi, Aichi-ken (JP)

(72) Inventors: Masakazu Kaifuku, Anjo (JP); Yuto Yuasa, Anjo (JP); Jyunichi Matoba, Anjo (JP); Masaru Katsuya, Anjo (JP); Kazuhiko Motodohi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 1039 days.

(21) Appl. No.: 15/115,007

(22) PCT Filed: Feb. 19, 2015

(86) PCT No.: PCT/JP2015/054582
§ 371 (c)(1),
(2) Date: Jul. 28, 2016

(87) PCT Pub. No.: WO2015/129542
PCT Pub. Date: Sep. 3, 2015

(65) Prior Publication Data
US 2017/0152944 A1    Jun. 1, 2017

(30) Foreign Application Priority Data

Feb. 28, 2014 (JP) ................. 2014-038495

(51) Int. Cl.
*F16H 61/686* (2006.01)
*F16H 61/04* (2006.01)
(Continued)

(52) U.S. Cl.
CPC ....... *F16H 61/686* (2013.01); *F16H 61/0031* (2013.01); *F16H 61/0206* (2013.01);
(Continued)

(58) Field of Classification Search
CPC ............... F16H 61/686; F16H 61/0437; F16H 61/0031; F16H 61/0206; F16H 61/30
(Continued)

(56) References Cited

U.S. PATENT DOCUMENTS 7,993,231 B2    8/2011 Shimizu et al.
2007/0232446 A1* 10/2007 Tanaka ................ F16H 61/0213
477/116
(Continued)

FOREIGN PATENT DOCUMENTS

JP    2008-064154 A    3/2008
JP    2009-024761 A    2/2009
(Continued)

OTHER PUBLICATIONS

May 26, 2015 Search Report issued in International Patent Application No. PCT/JP2015/054582.

*Primary Examiner* — Charles A Fox
*Assistant Examiner* — Michael E Butler
(74) *Attorney, Agent, or Firm* — Oliff PLC

(57) ABSTRACT

A control device that includes an electronic control unit that is configured to perform neutral travel control that controls the transmission apparatus to enter a neutral state in which power is not transferred during rotation of the wheel, wherein the electronic control unit performs switching between an engaged neutral state in which a particular engagement device of the plurality of engagement devices is put in an engagement state and the transmission apparatus is put in a state in which power is not transferred and a released neutral state in which all of the plurality of engagement devices are put in a released state and the transmission apparatus is put in the state in which power is not transferred, based on at least a vehicle speed during the neutral travel control.

14 Claims, 17 Drawing Sheets

(51) Int. Cl.
*F16H 61/00* (2006.01)
*F16H 61/02* (2006.01)
*F16H 61/30* (2006.01)
*F16H 59/18* (2006.01)

(52) U.S. Cl.
CPC ......... *F16H 61/0437* (2013.01); *F16H 61/30* (2013.01); *B60Y 2300/18083* (2013.01); *F16H 2059/186* (2013.01); *F16H 2061/0488* (2013.01); *F16H 2306/00* (2013.01)

(58) Field of Classification Search
USPC ........................................................ 701/51
See application file for complete search history.

(56) References Cited

U.S. PATENT DOCUMENTS

| | | |
|---|---|---|
| 2008/0058156 A1 | 3/2008 | Kakisaka et al. |
| 2008/0172161 A1* | 7/2008 | Kondo ................. F16H 61/143 701/66 |
| 2009/0023552 A1* | 1/2009 | Ohtake ........... B60W 30/18063 477/93 |
| 2011/0246036 A1 | 10/2011 | Tsutsui et al. |
| 2011/0301796 A1* | 12/2011 | Ohashi .................. B60K 6/387 701/22 |
| 2013/0324364 A1 | 12/2013 | Suzuki et al. |
| 2016/0258531 A1* | 9/2016 | Ito ............................ F16H 9/18 |

FOREIGN PATENT DOCUMENTS

| | | | |
|---|---|---|---|
| JP | 2009-150532 A | 7/2009 | |
| JP | 2011-214643 A | 10/2011 | |
| JP | 2012-167587 A | 9/2012 | |
| WO | 2012/133666 A1 | 10/2012 | |

* cited by examiner

FIG. 4

|       | C1 | C2 | C3 | B1 | B2  | F |
|-------|----|----|----|----|-----|---|
| P,N   |    |    |    |    |     |   |
| 1st   | ○  |    |    |    | (○) | △ |
| 2nd   | ○  |    |    | ○  |     |   |
| 3rd   | ○  |    | ○  |    |     |   |
| 4th   | ○  | ○  |    |    |     |   |
| 5th   |    | ○  | ○  |    |     |   |
| 6th   |    | ○  |    | ○  |     |   |
| Rev   |    |    | ○  |    | ○   |   |
| RELEASED NEUTRAL STATE |  |  |  |  |  |  |
| ENGAGED NEUTRAL STATE  |  | ○ |  |  |  |  |

(○): APPLICATION OF ENGINE BRAKING

| | S1 | S2 |
|---|---|---|
| NORMAL TRAVEL (D AND R RANGES) | ON (close) | OFF (close) |
| APPLICATION OF ENGINE BRAKING 1ST FORMATION | OFF (open) | ON (open) |
| R RANGE DURING FORWARD TRAVEL | ON (close) | ON (open) |
| RELEASED NEUTRAL STATE | ON (close) | ON (open) |
| ENGAGED NEUTRAL STATE | ON (close) | OFF (close) |
| POWER INTERRUPTION STATE | OFF (open) | OFF (close) |

| RETURN TIME TRANSMISSION SHIFT STAGE | DETERMINATION RESULT | DETERMINATION RESULT | COMMON ENGAGEMENT DEVICE | ENGAGEMENT DEVICE ENGAGED |
|---|---|---|---|---|
| 1st | HIGH TRANSMISSION SHIFT RATIO STAGES | RELEASED NEUTRAL STATE | C1 | NON (S2 IS ON INSTEAD) |
| 2nd | | | | |
| 3rd | | | | |
| 4th | LOW TRANSMISSION SHIFT RATIO STAGES | ENGAGED NEUTRAL STATE | C2 | C2 (PARTICULAR ENGAGEMENT DEVICE) |
| 5th | | | | |
| 6th | | | | |

COMPARISON EXAMPLE OF RELEASED NEUTRAL STATE

FIG. 19

|      | C1 | C2 | C3 | B1 | B2 | B3 | B4  | F |
|------|----|----|----|----|----|----|-----|---|
| 1st  | ○  |    |    | ○  |    |    | (○) | △ |
| 2nd  | ○  |    |    | ○  | ○  |    |     |   |
| 3rd  | ○  |    | ○  | ○  |    |    |     |   |
| 4th  | ○  |    | ○  |    |    | ○  |     |   |
| 5th  | ○  | ○  | ○  |    |    |    |     |   |
| 6th  |    | ○  | ○  |    |    | ○  |     |   |
| 7th  |    | ○  | ○  | ○  |    |    |     |   |
| 8th  |    | ○  |    | ○  | ○  |    |     |   |
| Rev 1|    |    | ○  | ○  |    |    | ○   |   |
| Rev 2|    |    | ○  |    |    | ○  | ○   |   |

(○): APPLICATION OF ENGINE BRAKING

CONTROL DEVICE FOR VEHICLE DRIVING DEVICE

BACKGROUND

The present disclosure relates to a control device for controlling a vehicle driving device provided with a transmission apparatus including a plurality of engagement devices in a power transmission path between a driving force source and wheels and selectively forming a plurality of transmission shift stages having different transmission shift ratios depending on the engagement states of the plurality of engagement devices.

The techniques described in, for example, WO2012/133666 and JP-A-2009-150532 are known as techniques for such a control device.

The technique described in WO2012/133666 makes neutral travel control that puts the transmission apparatus in a neutral state during rotation of wheels in which power is not transferred. The technique in WO2012/133666 changes the engagement devices to be engaged of the transmission apparatus depending on the target transmission shift stage determined based on the vehicle speed and the like during neutral travel control.

The technique described in JP-A-2009-150532 can form a transmission shift stage specific to the transmission apparatus when power to a hydraulic pressure control device is interrupted. The technique in JP-A-2009-150532 forms a third transmission shift stage 3RD or a fifth transmission shift stage 5TH during an electric power interruption depending on whether a first clutch C-1 or a second clutch C-2 is supplied with a hydraulic pressure before the electric power interruption.

SUMMARY

In the technique in WO2012/133666, the engagement device engaged may be changed when the target transmission shift stage is changed due to a change in vehicle speed or the like during neutral travel control.

However, when the engagement device engaged is changed during neutral travel control, an inertial torque is generated due to a change in the rotation speed of the rotary member in the transmission apparatus and the inertial torque may be transferred to wheels.

Accordingly, there is a need to provide a control device that prevents torque fluctuations generated when the engagement device engaged is changed during neutral travel control from being transferred to wheels.

According to an exemplary aspect of the disclosure, the control device controls a vehicle driving device provided with a transmission apparatus including a plurality of engagement devices in a power transmission path between a driving force source and a wheel and selectively forming a plurality of transmission shift stages having different transmission shift ratios depending on engagement states of the plurality of engagement devices, the control device including an electronic control unit that is configured to perform neutral travel control that controls the transmission apparatus to enter a neutral state in which power is not transferred during rotation of the wheel, wherein the electronic control unit performs switching between an engaged neutral state in which a particular engagement device of the plurality of engagement device is put in an engagement state and the transmission apparatus is put in a state in which power is not transferred and a released neutral state in which all of the plurality of engagement devices are put in a released state and the transmission apparatus is put in the state in which power is not transferred, based on at least a vehicle speed during the neutral travel control.

In the above configuration, the one particular engagement device of the plurality of engagement devices is engaged when the engaged neutral state is entered or all engagement devices are released when the released neutral state is entered. Accordingly, even when switching between the engaged neutral state and the released neutral state is performed due to a change in vehicle speed or the like during neutral travel control, it is not necessary to make a hold change of engagement devices in a plurality of engagement devices. For example, during switching from the engaged neutral state to the released neutral state, it is sufficient to release only the particular engagement device and other engagement devices do not need to be engaged. In contrast, during switching from the released neutral state to the engaged neutral state, it is sufficient to engage only the particular engagement device and other engagement devices do not need to be released.

When a hold change of engagement devices is made, the rotation speeds of rotary members such gear mechanisms included in the transmission apparatus need to changed, the change in the rotation speeds generates an inertial torque by the inertial moment of the rotary members, and the inertial torque may be transferred to wheels as torque fluctuations. In addition, when a hold change of engagement devices is made as quickly as possible to prepare for a return from neutral travel control to normal travel, the inertial torque may increase. However, in the above configuration, a hold change of engagement devices is not made even when switching between the engaged neutral state and the released neutral state is performed, thereby preventing the inertial torque from being generated and torque fluctuations from being transferred to wheels.

Preferably, the electronic control unit performs switching between the engaged neutral state and the released neutral state based on a return time transmission shift stage determined based on at least the vehicle speed as a transmission shift stage formed during returning from the neutral state to a normal transmission shift state at present time in which the transmission apparatus forms the transmission shift stage.

In the structure, it is possible to perform switching to the engaged neutral state or the released neutral state, whichever is more appropriate for returning to the normal transmission shift state in which the return time transmission shift stage is formed, based on the return time transmission shift stage.

In addition, the electronic control unit determines whether the vehicle speed is in a predetermined low vehicle speed range or a high vehicle speed range higher than the low vehicle speed range and determines whether the return time transmission shift stage is included in high transmission shift ratio stages, which are one or more predetermined transmission shift stages, or included in low transmission shift ratio stages, which are one or more transmission shift stages having transmission shift ratios lower than the high transmission shift ratio stages, the released neutral state is entered when the vehicle speed is in the low vehicle speed range and the return time transmission shift stage is included in to the high transmission shift ratio stages or when the vehicle speed is in the high vehicle speed range and the return time transmission shift stage is included in the low transmission shift ratio stages, and the engaged neutral state is entered unless the released neutral state is entered.

In the structure, if the released neutral state is entered when the determination result indicates the low vehicle speed range and the high transmission shift ratio stages or the engaged neutral state is entered unless the released neutral state is entered, it is determined that switching to the engaged neutral state is preceded when the determination result indicates the high vehicle speed range or the low transmission shift ratio stages. Accordingly, when the vehicle speed is in the high vehicle speed range even if determination result indicates the high transmission shift ratio stages, switching to the engaged neutral state on the low transmission shift ratio stage side is determined. Therefore, when, for example, a return to the normal transmission shift state is made or a hydraulic control fail occurs, a low transmission shift ratio stage can be formed in the state in which the vehicle speed is high. Accordingly, it is possible to prevent the rotation speed of the driving force source from suddenly increasing and a large negative torque from being transferred to the wheels. In addition, since the frequency at which the engaged neutral state is entered is high in this case, a return time transmission shift stage can be early formed in the transmission apparatus when returning to the normal transmission shift state.

In contrast, if the released neutral state is entered when the determination result indicates the high vehicle speed range and the low transmission shift ratio stages and the engaged neutral state is entered unless the released neutral state is entered, it is determined that switching to the engaged neutral state is preceded when the determination result indicates the low vehicle speed range or the high transmission shift ratio stages. Accordingly, when the vehicle speed is in the low vehicle speed range even if determination result indicates the low transmission shift ratio stages, switching to the engaged neutral state on the high transmission shift ratio stage side is determined. Therefore, when, for example, a return to the normal transmission shift state is made or a hydraulic control fail occurs, a high transmission shift ratio stage can be formed in the state in which the vehicle speed is low. Accordingly, it is possible to prevent the rotation speed of the driving force source from suddenly reducing and the driving force of the driving force source from being fluctuating and transferred to the wheels. In addition, since the frequency at which the released neutral state is entered is high in this case, the fuel economy can be improved by reducing the hydraulic pressure supplied to the engagement device.

Preferably, the particular engagement device is an engagement device engaged in common in a plurality of return time transmission shift stages determined to be the low transmission shift ratio stages or a plurality of the return time transmission shift stages determined to be the high transmission shift ratio stages.

Since a common engagement device of a plurality of transmission shift stages determined to be low transmission shift ratio stages or high transmission shift ratio stages has been already engaged as the particular engagement device during a return from the neutral travel control to the normal transmission shift state in this structure, only if the engagement devices other than the common engagement device are engaged, the return time transmission shift stage can be formed early in the transmission apparatus.

In addition, the vehicle driving device has the driving force source as a first driving force source and a rotary electric machine drivably coupled to the wheel by bypassing the transmission apparatus as a second driving force source, the electronic control unit determines whether the vehicle speed is in a predetermined low vehicle speed range or a high vehicle speed range higher than the low vehicle speed range and determines whether the return time transmission shift stage is included in high transmission shift ratio stages, which are one or more predetermined transmission shift stages, or included in low transmission shift ratio stages, which are one or more transmission shift stage having transmission shift ratios lower than the high transmission shift ratio stages, the engaged neutral state is entered at least when the vehicle speed is in the high vehicle speed range and the return time transmission shift stage is included in the low transmission shift ratio stages in a state in which the wheel is rotated using a driving force of the rotary electric machine without using a driving force of the first driving force source, and preferably, the particular engagement device is an engagement device engaged in common in the plurality of the return time transmission shift stages determined to be the low transmission shift ratio stages.

Note that a "rotary electric machine" in the application indicates a motor (electric motor), a generator (electric generator), and, as appropriate, a motor generator including the functions of a motor and generator.

In the above structure, when, for example, a return to the normal transmission shift state is performed to transfer the driving force of the first driving force source to the wheels or a hydraulic control fail occurs, the low transmission shift ratio stage can be formed in the state in which the vehicle speed is high and the vehicle request torque requested to drive the wheels is high. Accordingly, it is possible to prevent the rotation speed of the first driving force source from suddenly increasing and a large negative torque from being transferred to the wheels.

Preferably, the control device for a vehicle driving device further includes a hydraulic pressure controller controlling hydraulic pressures supplied to the plurality of engagement devices and a fail use hydraulic passage switching valve switching the engagement device to which the hydraulic pressure of the hydraulic pressure source is supplied during occurrence of a hydraulic control fail disabling the hydraulic pressure controller from functioning normally, in which the fail use hydraulic passage switching valve performs switching between hydraulic passages so that the hydraulic pressure of the hydraulic pressure source is supplied to the particular engagement device during occurrence of the hydraulic control fail by receiving the hydraulic pressure supplied to the particular engagement device in the engaged neutral state as a first instructed hydraulic pressure.

In the structure, by engaging the particular engagement device in the engaged neutral state, even when a hydraulic control fail occurs, the transmission shift stage can be formed in the transmission apparatus by engaging the particular engagement device.

In addition, preferably, the control device for a vehicle driving device further includes the hydraulic pressure controller controlling hydraulic pressures supplied to the plurality of engagement devices, the fail use hydraulic passage switching valve switching the engagement device to which the hydraulic pressure of the hydraulic pressure source is supplied during occurrence of the hydraulic control fail disabling the hydraulic pressure controller from functioning normally, and a hydraulic pressure control valve controlling a hydraulic pressure supplied to the fail use hydraulic passage switching valve as a second instructed hydraulic pressure, in which the electronic control unit controls the hydraulic pressure control valve in the released neutral state to supply the second instructed hydraulic pressure to the fail use hydraulic passage switching valve and the fail use hydraulic passage switching valve switches the hydraulic passage so that the hydraulic pressure of the hydraulic pressure source is supplied to an engagement device other than the particular engagement device during occurrence of the hydraulic control fail by receiving the second instructed hydraulic pressure from the hydraulic pressure control valve.

In the structure, even when all engagement devices are released in the released neutral state, by controlling the hydraulic pressure control valve to supply the second instructed hydraulic pressure to the fail use hydraulic passage switching valve, the transmission shift stage can be formed in the transmission apparatus by engaging an engagement device other than the particular engagement device even when a hydraulic control fail occurs.

BRIEF DESCRIPTION OF THE DRAWINGS

FIG. 4 is an operation table for a transmission apparatus according to the embodiment of the disclosure.

FIG. 19 is an operation table for a transmission apparatus according to the other embodiment of the disclosure.

DETAILED DESCRIPTION OF EMBODIMENTS

Figure 1:
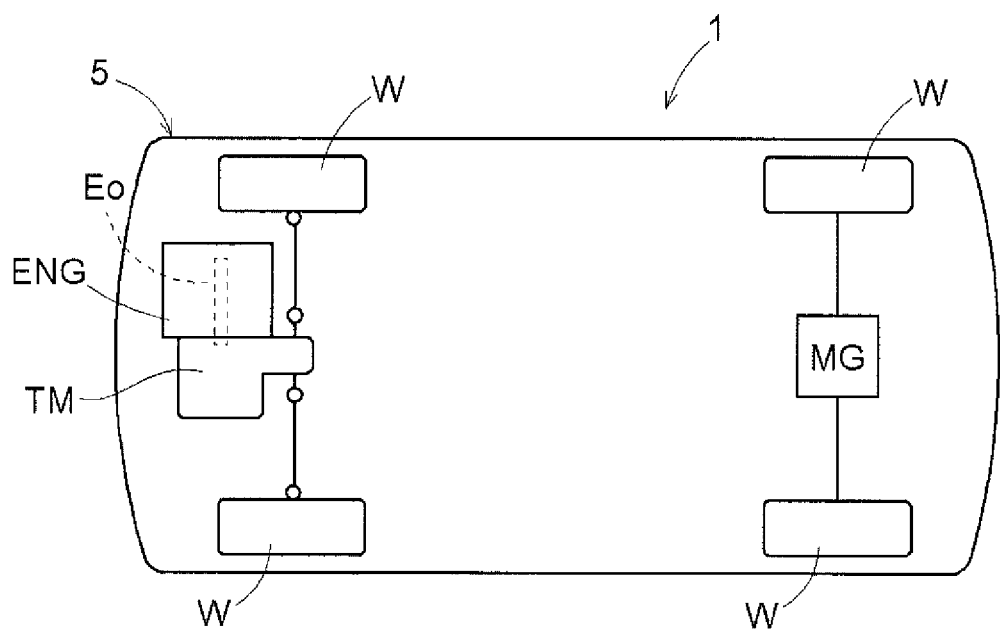
FIG. 1 is a schematic view illustrating the schematic structure of a vehicle according to an embodiment of the disclosure.
Figure 2:
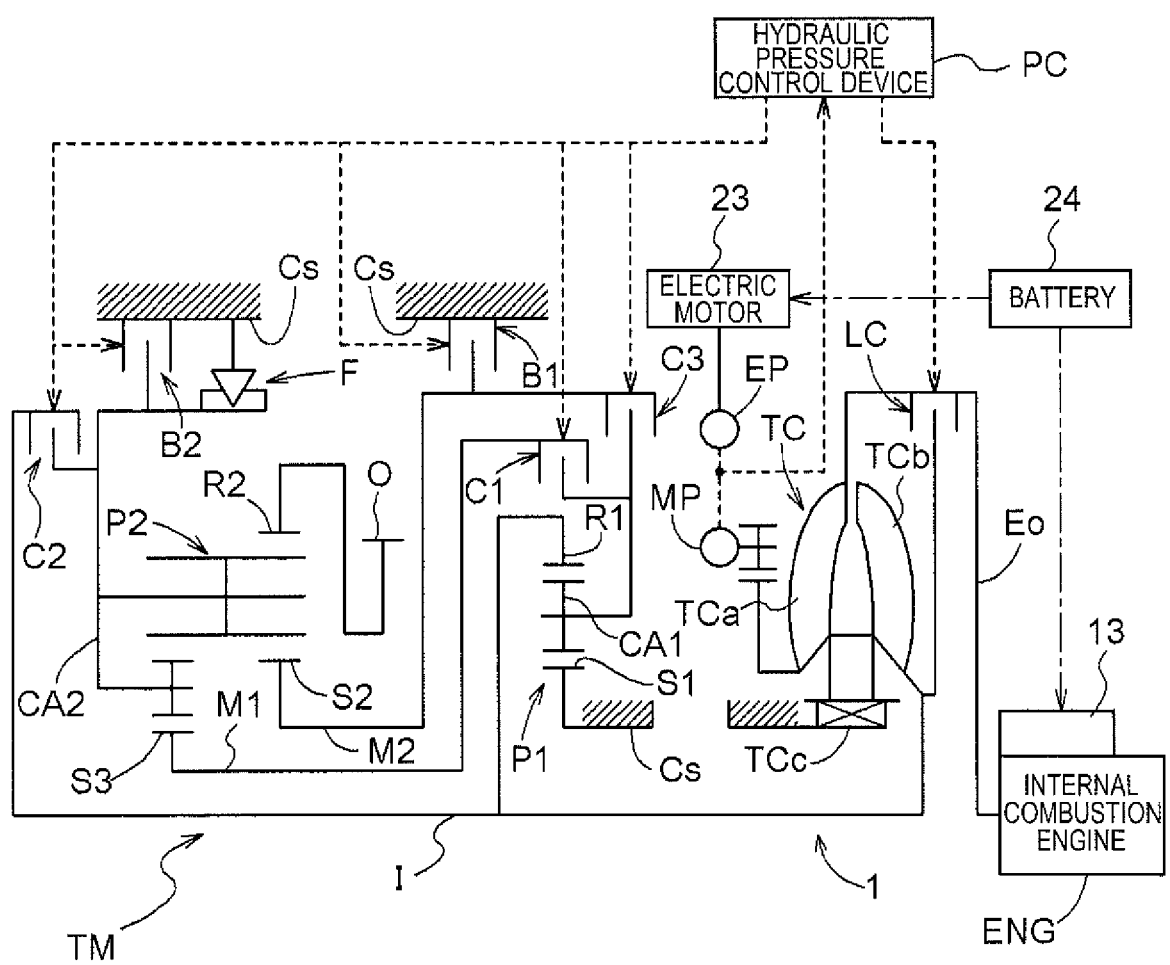
FIG. 2 is a skeleton view illustrating a vehicle driving device according to the embodiment of the disclosure.

An embodiment of a control device 30 of a vehicle driving device for controlling a vehicle driving device 1 according to the disclosure will be described with reference to the drawings. FIGS. 1 and 2 are schematic views illustrating the schematic structure of the vehicle driving device 1 according to the embodiment.

In the embodiment, the vehicle driving device 1 has an internal combustion engine ENG as the first driving force source for wheels W. The vehicle driving device 1 is provided with a transmission apparatus TM in a power transmission path between the internal combustion engine ENG and the wheels W. In addition, the vehicle driving device 1 is provided with a rotary electric machine MG as the second driving force source drivably coupled to the wheels W by bypassing the transmission apparatus TM. In the embodiment, the internal combustion engine ENG is drivably coupled to rear wheels of a vehicle 5 via the transmission apparatus TM and the rotary electric machine MG is drivably coupled to front wheels of the vehicle 5. The transmission apparatus TM has a plurality of engagement devices C1, B1, . . . and a plurality of transmission shift stages having different transmission shift ratios are selectively formed depending on the engagement states of the plurality of engagement devices C1, B1, . . . .

In the application, "drivably coupling" indicates the state in which two rotary elements are coupled to each other so as to transfer a driving force, the state in which the two elements are coupled to each other so as to be integrally rotatable, or the state in which the two elements are coupled to each other via one or more transmission members so as to transfer a driving force. Such transmission members include various types of members that transfer rotation by changing or without changing the speed, such as, for example, a shaft, gear mechanism, belt, and chain. In addition, such transmission members may include an engagement device selectively transferring rotation and a driving force, such as, for example, a friction engagement device and meshing engagement device.

Figure 3:
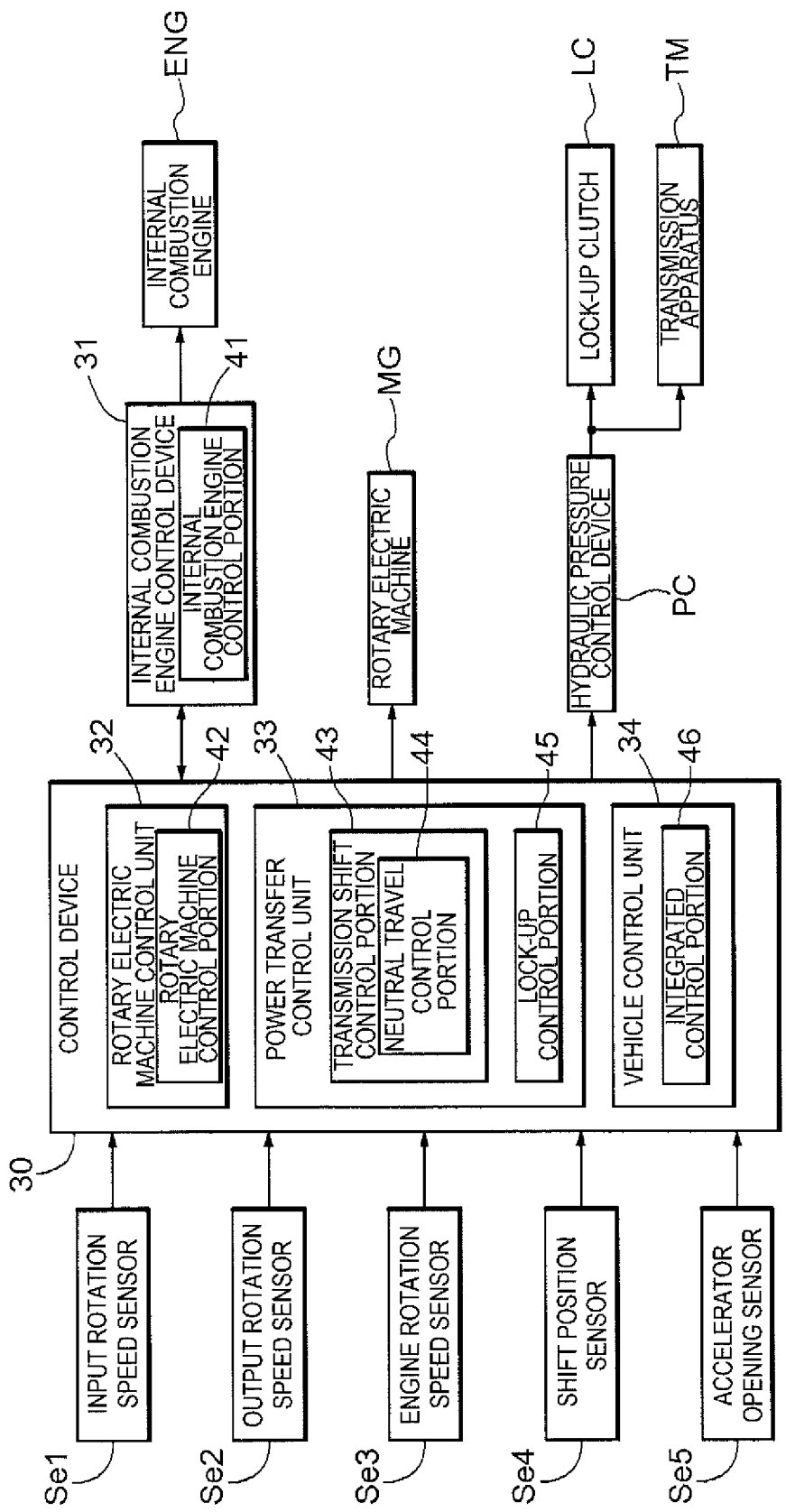
FIG. 3 is a schematic view illustrating the schematic structures of a vehicle driving device and a control device according to the embodiment of the disclosure.

As illustrated in FIG. 3, the control device 30 according to the embodiment includes a rotary electric machine control unit 32 controlling the rotary electric machine MG, a power transfer control unit 33 controlling the transmission apparatus TM, and a vehicle control unit 34 controlling the vehicle driving device 1 by integrating these control devices. In addition, a hybrid vehicle is also provided with an internal combustion engine control device 31 controlling the internal combustion engine ENG.

The control device 30 includes functional portions such as a neutral travel control portion 44 (i.e., electronic control unit).

The neutral travel control portion 44 performs neutral travel control for putting the transmission apparatus TM in the neutral state in which no power is transferred, during rotation of the wheels W. The neutral travel control portion 44 according to the embodiment performs switching between the engaged neutral state in which a particular engagement device, which is one of the plurality of engagement devices C1, B1, . . . , is put in the engagement state and the released neutral state in which all of the plurality of engagement devices C1, B1, . . . are put in released state, based on at least the vehicle speed during neutral travel control.

The vehicle driving device 1 and the control device 30 according to the embodiment will be described in detail below.

1. Structure of the Vehicle Driving Device 1

First, the structure of the vehicle driving device 1 according to the embodiment will be described. FIG. 2 is a schematic view illustrating the structures of the driving transmission system and hydraulic pressure supply system of the vehicle driving device 1 according to the embodiment. Note that a part of the axisymmetric structure is omitted in FIG. 2. In this drawing, solid lines indicate the transmission paths of driving forces, dashed lines indicate the supply paths of working oil, and dot-dash lines indicate the supply paths of electric power. In the embodiment, the vehicle driving device 1 transfers the rotary driving force of the internal combustion engine ENG as the first driving force source of the wheels W to the transmission apparatus TM via a torque converter TC, changes the speed using the transmission apparatus TM, and transfers the rotary driving force to the wheels W. The transmission apparatus TM changes the speed of the rotary driving force transferred to an input shaft I and transfers the rotary driving force to an output gear O.

The internal combustion engine ENG is a thermal engine driven by combustion of fuel and may be various types of known internal combustion engines such as, for example, a gasoline engine and diesel engine. In this example, an internal combustion engine output shaft Eo such as the crank shaft of the internal combustion engine ENG is drivably coupled to the input shaft I via the torque converter TC.

The torque converter TC is a power transmission system that transfers power between a pump impeller TCa drivably coupled to the internal combustion engine output shaft Eo and a turbine runner TCb drivably coupled to the input shaft I via working oil supplied to the inside. The torque converter TC includes a stator TCc with a one-way clutch between the pump impeller TCa and the turbine runner TCb and a lock-up clutch LC coupling the pump impeller TCa to the turbine runner TCb so that the pump impeller TCa and the turbine runner TCb are rotated integrally. A mechanical pump MP is drivably coupled to the pump impeller TCa so as to rotate integrally with the pump impeller TCa.

In the embodiment, a starter 13 is provided adjacently to the internal combustion engine ENG. The starter 13 includes a direct current motor and the like and is electrically connected to a battery 24. The starter 13 is driven by electric power supplied from the battery 24 in the state in which the internal combustion engine ENG is stopped, rotates the internal combustion engine output shaft Eo, and starts the internal combustion engine ENG.

In the embodiment, the transmission apparatus TM is a stepped automatic transmission apparatus having a plurality of transmission shift stages of different transmission shift ratios. The transmission apparatus TM includes a gear mechanism such as a planetary gear mechanism and the plurality of engagement devices C1, B1, . . . to form the plurality of transmission shift stages. The transmission apparatus TM converts the torque while changing the rotation speed of the input shaft I using transmission shift ratios of the transmission shift stages and transfers the changed torque to the output gear O. The torque transferred from the transmission apparatus TM to the output gear O is transferred while being distributed to two left and right axles via a differential gear device and then transferred to the wheels W drivably coupled to the axles. Here, the transmission shift ratio is the ratio of the rotation speed of the input shaft I to the rotation speed of the output gear O in the case in which the transmission shift stages are formed in the transmission apparatus TM and the transmission shift ratio is obtained by dividing the rotation speed of the input shaft I by the rotation speed of the output gear O in the application. That is, the rotation speed of the output gear O is obtained by dividing the rotation speed of the input shaft I by the transmission shift ratio. In addition, the torque transferred from the transmission apparatus TM to the output gear O is obtained by multiplying the torque transferred from the input shaft I to the transmission apparatus TM by the transmission shift ratio.

<Gear Mechanism>

As illustrated in FIG. 2, a first planetary gear mechanism PG1 is a single pinion type planetary gear mechanism having three rotary elements: a carrier CA1 supporting a plurality of pinion gears P1 and a sun gear S1 and a ring gear R1 engaged with the pinion gears P1. A second planetary gear mechanism PG2 is a Ravigneau type planetary gear mechanism having four rotary elements: two sun gears (first sun gear S2 and second sun gear S3), a ring gear R2, and a common carrier CA2 supporting a long pinion gear P2 engaged with the first sun gear S2 and the ring gear R2 and a short pinion gear P3 engaged with the long pinion gear P2 and the second sun gear S3.

The sun gear S1 of the first planetary gear mechanism PG1 is fixed to a case CS, which is a non-rotary member. The carrier CA1 is drivably coupled to the second sun gear S3 of the second planetary gear mechanism PG2 via a second intermediate shaft M2 by engagement of a third clutch C3 so as to selectively rotate integrally with the second sun gear S3, drivably coupled to the first sun gear S2 of the second planetary gear mechanism PG2 via a first intermediate shaft M1 by engagement of a first clutch C1 so as to selectively rotate integrally with the first sun gear S2, and selectively fixed to the case CS by engagement of the first brake B1. The ring gear R1 is drivably coupled to the input shaft I so as to rotate integrally with the input shaft I.

The first sun gear S2 of the second planetary gear mechanism PG2 is drivably coupled to the carrier CA1 of the first planetary gear mechanism PG1 via the second intermediate shaft M2 by engagement of the third clutch C3 so as to selectively rotate integrally with the carrier CA1 and selectively fixed to the case CS by the first brake B1. The second sun gear S3 is drivably coupled to the carrier CA1 of the first planetary gear mechanism PG1 via the first intermediate shaft M1 by engagement of the first clutch C1 so as to selectively rotate integrally with the carrier CA1 of the first planetary gear mechanism PG1. The carrier CA2 is drivably coupled to the input shaft I by engagement of a second clutch C2 so as to selectively rotate integrally with the input shaft I and selectively fixed to the case CS by engagement of a second brake B2 or a one-way clutch F. The one-way clutch F selectively fixes the carrier CA2 to the case CS by blocking rotation only in one direction. The ring gear R2 is drivably coupled to the output gear O so as to rotate integrally with the output gear O.

<Transmission Shift Stage>

In the embodiment, as illustrated in the operation table in FIG. 4, the transmission apparatus TM has six transmission shift stages having different transmission shift ratios (reduction transmission ratio) as forward stages: first stage (1st), second stage (2nd), third stage (3rd), fourth stage (4th), fifth stage (5th), and sixth stage (6th). To configure these transmission shift stages, the transmission apparatus TM includes a gear mechanism having the first planetary gear device P1 and the second planetary gear device P2 and the six engagement devices C1, C2, C3, B1, B2, and F. Switching between the six transmission shift stages is performed by controlling the engagement and release of the plurality of engagement devices C1, B1, . . . except the one-way clutch F, performing switching between the rotary states of the rotary elements of the first planetary gear device P1 and the second planetary gear device P2, and selectively engaging two of the plurality of engagement devices C1, B1, . . . . Note that the transmission apparatus TM has one reverse stage Rev in addition to the above six transmission shift stages.

In FIG. 4, a mark "○" indicates that the engagement device is in the engagement state and no mark indicates that the engagement device is in the release state. The mark "⊙" indicates that the engagement device is put in the engagement state during use of engine braking or the like. A mark "Δ" indicates that the engagement device enters the release state when rotating in one direction or enters the engagement state when rotating in the other direction.

Figure 5:
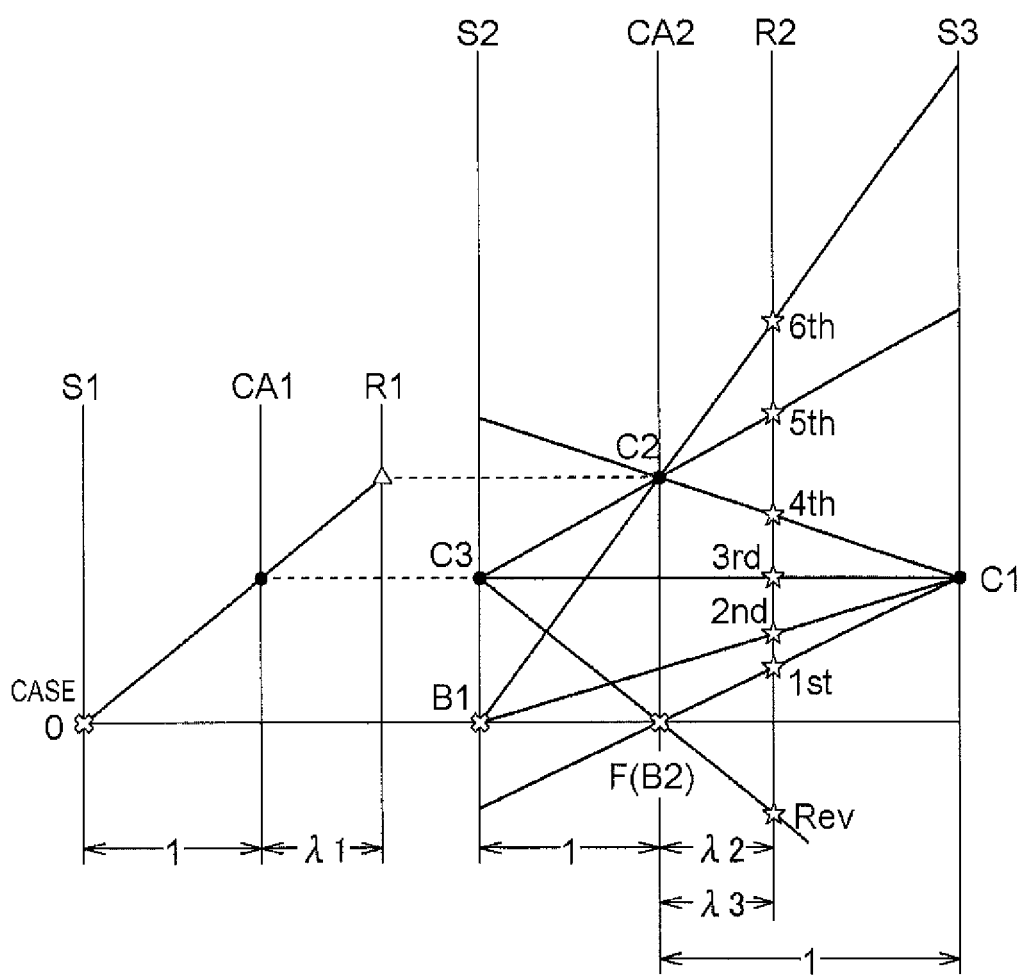
FIG. 5 is a line chart illustrating the speed of the transmission apparatus according to the embodiment of the disclosure.

FIG. 5 is a line chart illustrating the speed of the transmission apparatus TM. In the line chart illustrating the speed, the vertical axis represents the rotation speeds of the rotary elements. That is, "0" in the vertical axis indicates that the rotation speed equals 0, the upper side indicates positive rotation (the rotation speed is positive), and the lower side indicates negative rotation (the rotation speed is negative). Each of a plurality of vertical lines arranged in parallel with each other corresponds to each of the rotary elements of the first planetary gear device P1 and each of the rotary elements of the second planetary gear device P2. That is, "S1", "CA1", and "R1" above the vertical lines correspond to the sun gear S1, the carrier CA1, and the ring gear R1 of the first planetary gear device P1, respectively. In addition, "S2", "CA2", "R2", and "S3" above the vertical lines correspond to the first sun gear S2, the carrier CA2, the ring gear R2, and the second sun gear S3 of the second planetary gear device P2, respectively. The spacing between the plurality of vertical lines in parallel with each other is determined based on gear ratio $\lambda$ (the ratio of the number of teeth of the sun gear to the number of teeth of the ring gear=[Number of teeth of sun gear]/[Number of teeth of ring gear]) of the planetary gear devices P1 and P2.

In addition, the mark "Δ" indicates the state in which the rotary element has been coupled to the input shaft I to be drivably coupled to the internal combustion engine ENG. A mark "☆" indicates the state in which the rotary element has been fixed to the case CS by the first brake B1, the second brake B2, or the one-way clutch F. A mark "k" indicates the state in which the rotary element has been coupled to the output gear O drivably coupled to a wheel. In addition, "1st", "2nd", "3rd", "4th", "5th", "6th", and "Rev" adjacent to the mark "☆" correspond to the transmission shift stages formed in the transmission apparatus TM.

As illustrated in FIG. 4 and FIG. 5, the first stage (1st) is formed when the first clutch C1 is engaged with the one-way clutch F. Specifically, when the first clutch C1 is in the engagement state, a rotary driving force of the input shaft I input to the ring gear R1 of the first planetary gear device P1 is reduced based on the gear ratio $\lambda1$ and transferred to the second sun gear S3 of the second planetary gear device P2. Then, when the rotary driving force from the input shaft I to the output gear O is transferred and the carrier CA2 of the second planetary gear device P2 negatively rotates in the case in which the first clutch C1 is in the engagement state, the one-way clutch F is put in the engagement state and fixed to the case CS, the rotary driving force of the second sun gear S3 is reduced based on a gear ratio $\lambda3$ and transferred to the output gear O. Note that, when the rotary driving force from the output gear O to the input shaft I is transferred and the carrier CA2 of the second planetary gear device P2 positively rotates, the one-way clutch F is put in the release state. The first stage achieved as described above is a transmission shift stage that transfers the rotary driving force from the input shaft I to the output gear O and does not transfer the rotary driving force from the output gear O to the input shaft I.

In addition, the first stage (1st) is formed when the first clutch C1 is engaged with the second brake B2. In the embodiment, the first stage is also formed in the state in which the second brake B2 is engaged and the one-way clutch F rotates idly without being engaged during use of engine braking or the like. Specifically, the first clutch C1 is in the engagement state and the rotary driving force of the input shaft I is reduced based on the gear ratio $\lambda1$ and transferred to the second sun gear S3 of the second planetary gear device P2. In addition, the second brake B2 is in the engagement state and the carrier CA2 of the second planetary gear device P2 is fixed to the case CS. Then, the rotary driving force of the second sun gear S3 is further reduced based on the gear ratio $\lambda3$ and transferred to the output gear O.

The second stage (2nd) is formed when the first clutch C1 is engaged with the first brake B1. Specifically, the first clutch C1 is in the engagement state and the rotary driving force of the input shaft I is reduced based on the gear ratio $\lambda1$ and transferred to the second sun gear S3 of the second planetary gear device P2. In addition, the first brake B1 is in the engagement state and the first sun gear S2 of the second planetary gear device P2 is fixed to the case CS. Then, the rotary driving force of the second sun gear S3 is further reduced based on the gear ratios $\lambda2$ and $\lambda3$ and transferred to the output gear O.

The third stage (3rd) is formed when the first clutch C1 is engaged with the third clutch C3. That is, the first clutch C1 is in the engagement state and the rotary driving force of the input shaft I is reduced based on the gear ratio $\lambda1$ and transferred to the second sun gear S3 of the second planetary gear device P2. In addition, the third clutch C3 is in the engagement state and the rotary driving force of the input shaft I is reduced based on the gear ratio $\lambda1$ and transferred to the first sun gear S2 of the second planetary gear device P2. Since the first sun gear S2 and the second sun gear S3 rotate at the same speed, the rotary driving force of the input shaft I reduced based on the gear ratio $\lambda1$ is transferred to the output gear O as is.

The fourth stage (4th) is formed when the first clutch C1 is engaged with the second clutch C2. That is, the first clutch C1 is in the engagement state and the rotary driving force of the input shaft I is reduced based on the gear ratio $\lambda1$ and transferred to the second sun gear S3 of the second planetary gear device P2. In addition, the second clutch C2 is in the engagement state and the rotary driving force of the input shaft I is transferred to the carrier CA2 of the second planetary gear device P2 as is. Then, the rotary driving force of the input shaft I determined based on the rotation speeds and the gear ratio $\lambda3$ of the carrier CA2 and the second sun gear S3 is transferred to the output gear O.

The fifth stage (5th) is formed when the second clutch C2 is engaged with the third clutch C3. That is, the second clutch C2 is in the engagement state and the rotary driving force of the input shaft I is transferred to the carrier CA2 of the second planetary gear device P2 as is. In addition, the third clutch C3 is in the engagement state and the rotary driving force of the input shaft I is reduced based on the gear ratio $\lambda1$ and transferred to the first sun gear S2 of the second planetary gear device P2. Then, the rotary driving force of the input shaft I determined based on the rotation speeds and the gear ratio $\lambda 2$ of the first sun gear S2 and the carrier CA2 is transferred to the output gear O.

The sixth stage (6th) is formed when the second clutch C2 is engaged with the first brake B1. That is, the second clutch C2 is in the engagement state and the rotary driving force of the input shaft I is transferred to the carrier CA2 of the second planetary gear device P2 as is. In addition, the first brake B1 is in the engagement state and the first sun gear S2 of the second planetary gear device P2 is fixed to the case CS. Then, the rotary driving force of the carrier CA2 is increased based on the gear ratio $\lambda 2$ and transferred to the output gear O.

The reverse stage (Rev) is formed when the third clutch C3 is engaged with the second brake B2. That is, the third clutch C3 is in the engagement state and the rotary driving force of the input shaft I is reduced based on the gear ratio $\lambda 1$ and transferred to the first sun gear S2 of the second planetary gear device P2. In addition, the second brake B2 is in the engagement state and the carrier CA2 of the second planetary gear device P2 is fixed to the case CS. Then, the rotary driving force of the first sun gear S2 is reduced based on the gear ratio $\lambda 2$, the rotation direction is reversed, and the reversed rotary driving force is transferred to the output gear O.

As described above, the transmission apparatus TM according to the embodiment has at least the first stage, the second stage, the third stage, and the fourth stage as transmission shift stages formed by engagement of the first clutch C1. In addition, the transmission apparatus TM has at least the fourth stage, the fifth stage, and the sixth stage as transmission shift stages formed by engagement of the second clutch C2. These transmission shift stages include the first stage, the second stage, the third stage, the fourth stage, the fifth stage, and the sixth stage in the descending order of the transmission shift ratio (reduction ratio) between the input shaft I and the output gear O.

<Friction Engagement Device>

In the embodiment, the plurality of engagement devices C1, C2, C3, B1, and B2 except the one-way clutch F included in the transmission apparatus TM are friction engagement devices. Specifically, these friction engagement devices include multi-disc clutches and multi-disc brakes that are operated by hydraulic pressure. The engagement states of these engagement devices C1, C2, C3, B1, and B2 are controlled by a hydraulic pressure supplied from a hydraulic pressure control device PC (i.e., hydraulic pressure controller). Note that the lock-up clutch LC is also a friction engagement device.

A friction engagement device transfers a torque between engagement members using friction between the engagement members. When a difference (slip) in rotation speed is present between engagement members of a friction engagement device, a torque (slip torque) of the transmission torque capacity is transferred from the member with a higher rotation speed to the member with a lower rotation speed by kinetic friction. When a difference (slip) in rotation speed is not present between engagement members of a friction engagement device, the friction engagement device transfers a torque up to the transmission torque capacity applied between the engagement members of the friction engagement device by static friction. Here, the transmission torque capacity is the maximum torque that can be transferred by the friction engagement device by friction. The transmission torque capacity changes in proportion to the engagement pressure of the friction engagement device. The engagement pressure is a pressure at which an input side engagement member (friction disc) and an output side engagement member (friction disc) are pushed against each other. In the embodiment, the engagement pressure changes in proportion to the supplied hydraulic pressure. That is, in the embodiment, the transmission torque capacity changes in proportion to the hydraulic pressure supplied to the friction engagement device.

Each of the friction engagement devices has a return spring and is biased to the release side by the reaction force of the spring. When a force caused by a hydraulic pressure supplied to the hydraulic cylinders of the engagement devices exceeds the reaction force of the spring, a transmission torque capacity starts arising in the friction engagement devices and the friction engagement devices change from the release state to the engagement state. The hydraulic pressure at which a transmission torque capacity starts arising is referred to as the stroke end pressure. In the friction engagement devices, the transmission torque capacity increases in proportion to an increase in the hydraulic pressure after the supplied hydraulic pressure exceeds the stroke end pressure. The friction engagement device may have no return spring and may make control using the difference between hydraulic pressures applied to both sides of the piston of the hydraulic cylinder.

In the embodiment, the engagement state is a state in which a transmission torque capacity arises in the engagement device and includes a slip engagement state and a direct engagement state. The release state is a state in which no transmission torque capacity arises in the engagement device. The slip engagement state is an engagement state in which a difference (slip) in rotation speed is present between engagement members of an engagement device and the direct engagement state is an engagement state in which no difference (slip) in rotation speed is present between engagement members of an engagement device. In addition, an indirect engagement state is an engagement state other than the direct engagement state and includes the release state and the slip engagement state.

Even when the control device 30 does not issue an instruction for generating a transmission torque capacity to the friction engagement device, a transmission torque capacity may arise by dragging between engagement members (friction members). For example, even when the piston does not push the friction members against each other, the friction members are in contact with each other and a transmission torque capacity may arise due to dragging between friction members. Accordingly, the "release state" includes the state in which a transmission torque capacity arises by dragging between friction members when the control device 30 does not issue an instruction for generating a transmission torque capacity to the friction engagement device.

<Rotary Electric Machine MG>

The rotary electric machine MG includes a stator fixed to a non-rotary member and a rotor rotatably supported radially inward in a position corresponding to the stator. The rotary electric machine MG (rotor) is drivably coupled to the wheels by bypassing the transmission apparatus TM. In the embodiment, as illustrated in FIG. 1, the rotary electric machine MG is drivably coupled to the front wheels instead of the rear wheels to which the transmission apparatus TM is drivably coupled. The rotary electric machine MG is connected to the battery as a storage device via an inverter that performs AC to DC conversion. The rotary electric machine MG can achieve the function of a motor (electric generator) generating power by receiving the supply of electric power and the function of a generator (electric generator) generating electric power by receiving the supply of power. That is, the rotary electric machine MG generates power by receiving the supply of electric power from the battery via the inverter or generates electric power using the rotary driving force transferred from the wheels W and the generated electric power is stored in the battery via the inverter. Here, the rotary driving force transferred from the wheels W includes the driving force by the internal combustion engine ENG transferred via the wheels W and the road surface.

2. Structure of the Hydraulic Pressure Control Device PC

The hydraulic pressure control system of the vehicle driving device 1 has the hydraulic pressure control device PC for adjusting the hydraulic pressure of working oil supplied from the oil pump MP and an oil pump EP to a predetermined pressure. The hydraulic pressure control device PC includes hydraulic pressure control valves such as a plurality of linear solenoid valves for adjusting the hydraulic pressure supplied to the engagement devices C1, B1, . . . , LC and the like. The hydraulic pressure control valve adjusts the openings of the valves according to the signal values of hydraulic pressure instructions supplied from the control device 30 and supplies the hydraulic pressures corresponding to the signal values to the engagement devices C1, B1, . . . , LC and the like.

The hydraulic circuit of the hydraulic pressure control device PC according to the embodiment will be described below with reference to FIGS. 6 and 7 which schematically illustrates the circuit in a simplified manner.

2-1. Hydraulic Pressure Source

Figure 6:
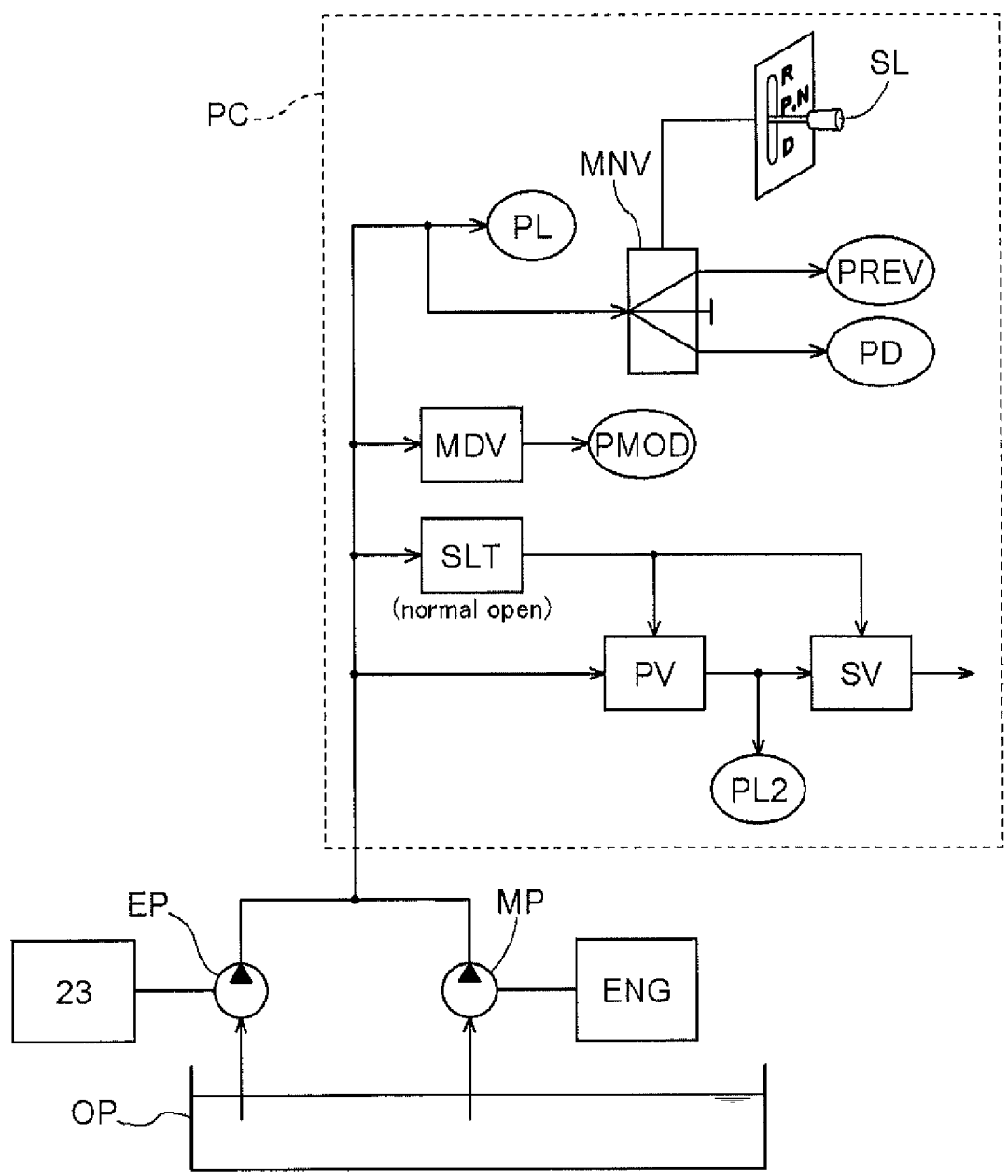
FIG. 6 schematically illustrates the hydraulic circuit of a hydraulic pressure control device according to the embodiment of the disclosure.

As illustrated in FIGS. 2 and 6, the hydraulic pressure control system has two types of oil pumps (the mechanical pump MP and the electric pump EP) as hydraulic pressure sources that suck working oil stored in an oil pan OP and supply the working oil to individual units of the vehicle driving device 1. The mechanical pump MP is drivably coupled to the internal combustion engine output shaft Eo via the pump impeller TCa of the torque converter TC and driven by the rotary driving force of the internal combustion engine ENG. The electric pump EP is an oil pump that is driven by the rotary driving force of an electric motor 23 regardless of the rotary driving force of the internal combustion engine ENG and discharges working oil. The electric motor 23 driving the electric pump EP is electrically connected to the battery 24, receives the supply of electric power from the battery 24, and generates a driving force. The electric pump EP operates in the state in which the necessary amount of oil is not supplied from the mechanical pump MP when the internal combustion engine ENG stops to assist the mechanical pump MP.

The hydraulic pressure control system has the hydraulic pressure control device PC for adjusting the hydraulic pressure of working oil supplied from the mechanical pump MP and the electric pump EP to a predetermined pressure. As illustrated in FIG. 6, the hydraulic pressure control device PC has a first regulating valve (primary regulator valve) PV and a second regulating valve (secondary regulator valve) SV as regulating valves for adjusting the hydraulic pressure of working oil supplied from the oil pumps MP and EP to a predetermined pressure. The first regulating valve PV is a regulating valve adjusting the hydraulic pressure of working oil supplied from the oil pumps MP and EP to a line pressure PL. The second regulating valve SV is a regulating valve adjusting the hydraulic pressure of excessive oil from the first regulating valve PV to a second line pressure PL2.

The first regulating valve PV and the second regulating valve SV are supplied with a signal pressure from a line hydraulic pressure control valve SLT. The first regulating valve PV adjusts the hydraulic pressure supplied from the oil pumps MP and EP to the line pressure PL according to the signal pressure supplied from the line hydraulic pressure control valve SLT. The second regulating valve SV adjusts the hydraulic pressure drained from the first regulating valve PV to the predetermined second line pressure PL2 according to the signal pressure supplied from the line hydraulic pressure control valve SLT.

In the embodiment, the line hydraulic pressure control valve SLT is a linear solenoid valve. The line hydraulic pressure control valve SLT receives the supply of the work oil having the line pressure PL adjusted by the first regulating valve PV, adjusts the opening of the valve according to the electric power (current) supplied from the control device 30, and outputs the working oil having an instructed hydraulic pressure according to the electric power (current). The control device 30 can continuously change the line pressure PL and the second line pressure PL2 by controlling electric power (current) supplied to the line hydraulic pressure control valve SLT.

The line hydraulic pressure control valve SLT is a normal open type hydraulic pressure control valve that is opened when electric power is not supplied to output a hydraulic pressure according to the hydraulic pressure supplied from the hydraulic pressure source by opening the valve.

A modulator valve MDV is a pressure reducing valve that reduces the pressure of working oil having the supplied line pressure PL and outputs working oil having a modulator hydraulic pressure PMOD, which is a constant hydraulic pressure.

A manual valve MNV is a hydraulic passage switching valve that mechanically switches the hydraulic passage in synch with the driver's operation of a shift lever SL. The manual valve MNV performs switching to the hydraulic passage supplying the supplied line pressure PL as a forward range pressure PD when the shift lever SL is positioned in a D range, switching to the hydraulic passage supplying the supplied line pressure PL as a reverse range pressure PREV when the shift lever SL is positioned in an R range, and switching so that the supplied line pressure PL is not supplied to any of these hydraulic passages when the shift lever SL is positioned in a P range or N range. Accordingly, the line pressure PL is supplied as the forward range pressure PD when the shift position is in the D range and the line pressure PL is supplied as the reverse range pressure PREV when the shift position is in the R range.

2-2. Supply of a Hydraulic Pressure to the Transmission Apparatus TM

<Transmission Shift Hydraulic Pressure Control Valves SLC1, SLC2, . . . >

Figure 7:
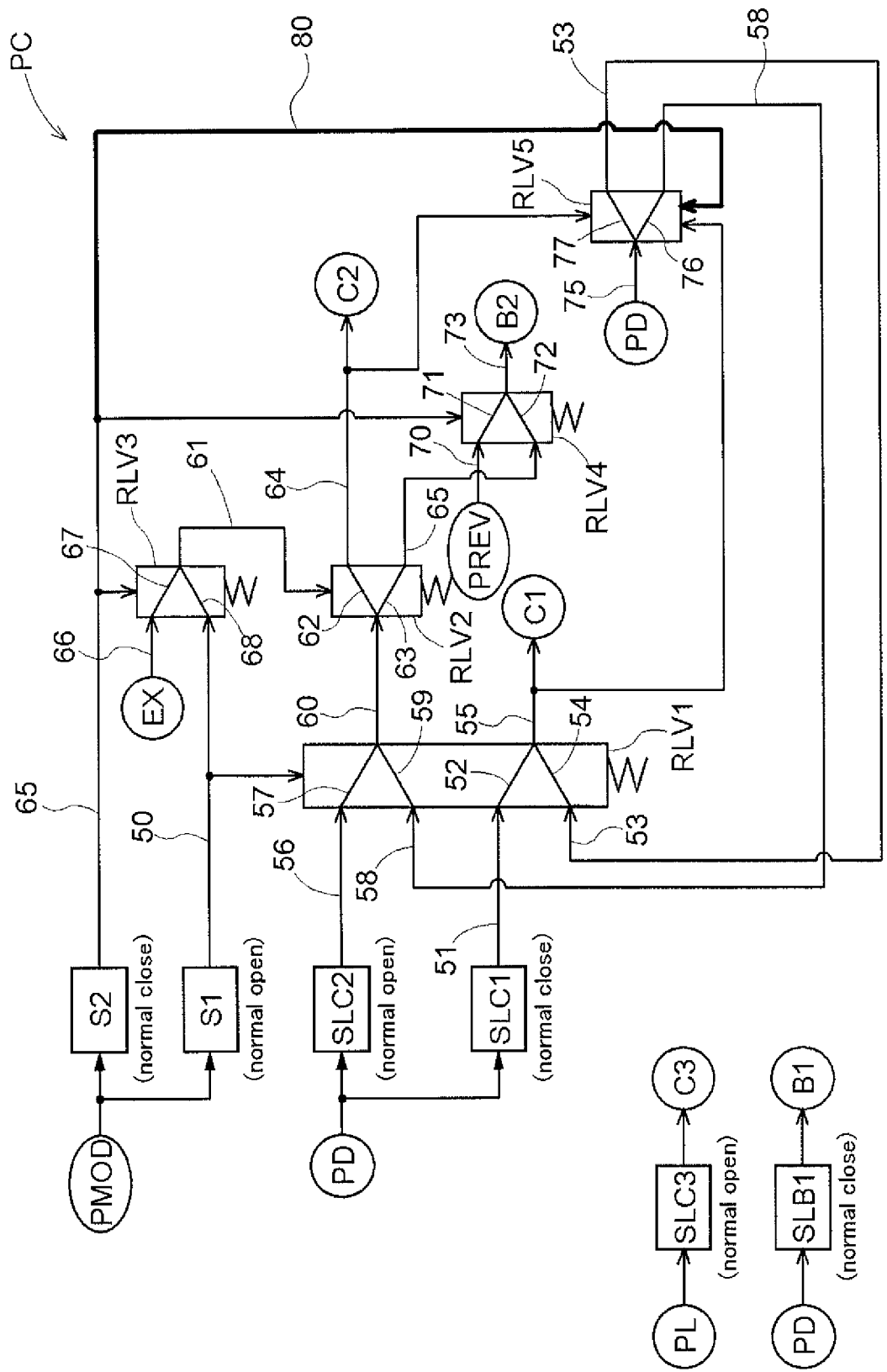
FIG. 7 schematically illustrates the hydraulic circuit of the hydraulic pressure control device according to the embodiment of the disclosure.

As illustrated in FIG. 7, the hydraulic pressure control device PC has transmission shift hydraulic pressure control valves SLC1, SLC2, . . . that adjust a hydraulic pressure supplied to a plurality of engagement device C1, C2, . . . included in the transmission apparatus TM.

The transmission shift hydraulic pressure control valves SLC1, SLC2, . . . receive the supply of the hydraulic pressures of hydraulic pressure sources such as the line pressure PL, adjust the openings of the valves according to the electric power supplied from the control device 30, and adjust the hydraulic pressures supplied to the engagement devices C1, C2, . . . .

In the embodiment, the transmission shift hydraulic pressure control valves SLC1, SLC2, . . . are linear solenoid valves and can continuously change the hydraulic pressures to be output by continuously changing the openings of the valves according to the electric power (current) supplied from the control device 30.

In the embodiment, the hydraulic pressure control device PC includes the first transmission shift hydraulic pressure control valve SLC1 adjusting the hydraulic pressure supplied to the first clutch C1, the second transmission shift hydraulic pressure control valve SLC2 adjusting the hydraulic pressure supplied to the second clutch C2 or the second brake B2, and a third transmission shift hydraulic pressure control valve SLC3 adjusting the hydraulic pressure supplied to the third clutch C3, and a fourth transmission shift hydraulic pressure control valve SLB1 adjusting the hydraulic pressure supplied to the first brake B1.

In the embodiment, the second transmission shift hydraulic pressure control valve SLC2 and the third transmission shift hydraulic pressure control valve SLC3 are normal open type hydraulic pressure control valves that are opened when electric power is not supplied and output the hydraulic pressures according to the hydraulic pressures supplied from the hydraulic pressure sources, and the first transmission shift hydraulic pressure control valves SLC1 and the fourth transmission shift hydraulic pressure control valve SLB1 are normal close type hydraulic pressure control valves that are closed when electric power is not supplied and output the reduced hydraulic pressures regardless of the hydraulic pressures supplied from the hydraulic pressure sources.

In addition, the forward range pressure PD is supplied to the first transmission shift hydraulic pressure control valve SLC1, the second transmission shift hydraulic pressure control valve SLC2, and the fourth transmission shift hydraulic pressure control valve SLB1. The line pressure PL is supplied to the third transmission shift hydraulic pressure control valve SLC3.

<Instructed Hydraulic Pressure Control Valves S1 and S2>

The hydraulic pressure control device PC has a first instructed hydraulic pressure control valve S1 and a second instructed hydraulic pressure control valve S2 that output instructed hydraulic pressures supplied to a plurality of hydraulic passage switching valves RLV1, RLV2, . . . .

The instructed hydraulic pressure control valves S1 and S2 receive the supply of hydraulic pressure of the hydraulic pressure source (the modulator hydraulic pressure PMOD), adjust the opening of the valves according to the electric power supplied from the control device 30, and adjust the hydraulic pressure to be output.

The instructed hydraulic pressure control valves S1 and S2 are solenoid valves in the embodiment and change the hydraulic pressure to be output by opening or closing the valves according to the electric power (voltage) supplied from the control device 30.

In the embodiment, the first instructed hydraulic pressure control valve S1 is a normal open type hydraulic pressure control valve that is opened when electric power is not supplied and outputs the hydraulic pressure according to the hydraulic pressure supplied from the hydraulic pressure source and the second instructed hydraulic pressure control valve S2 is a normal close type hydraulic pressure control valve that is closed when electric power is not supplied and outputs the reduced hydraulic pressure regardless of the hydraulic pressure supplied from the hydraulic pressure source.

<Hydraulic Passage Switching Valves RLV1, RLV2, . . . >

The hydraulic pressure control device PC has the plurality of hydraulic passage switching valves RLV1, RLV2, . . . that perform switching between the hydraulic passages of hydraulic pressures supplied to the engagement devices C1, C2, . . . .

The hydraulic passage switching valve has a cylindrical sleeve in which the input/output ports for working oil and an instructed hydraulic pressure are formed and a spool that slides the inside of the sleeve in an axial direction. The spool moves toward one side or the other side in the axial direction according to the balance between pressing forces pushing the spool toward one side and the other side in the axial direction using a spring or the instructed hydraulic pressure to switch the hydraulic passage connecting the input to the output port.

When the instructed hydraulic pressure supplied from an output hydraulic passage 50 of the first instructed hydraulic pressure control valve S1 is lower than a reference hydraulic pressure, the first hydraulic passage switching valve RLV1 performs switching to a hydraulic passage 52 connecting an input hydraulic passage 51 to which the output hydraulic pressure of the first transmission shift hydraulic pressure control valve SLC1 has been supplied to a first output hydraulic passage 55 supplying the hydraulic pressure to the first clutch C1. When the instructed hydraulic pressure is higher than the reference hydraulic pressure, the first hydraulic passage switching valve RLV1 performs switching to a hydraulic passage 54 connecting a first output hydraulic passage 53 of a fifth hydraulic passage switching valve RLV5 to the output hydraulic passage 55 supplying the hydraulic pressure to the first clutch C1.

In addition, when the instructed hydraulic pressure supplied from an output hydraulic passage 50 of the first instructed hydraulic pressure control valve S1 is lower than a reference hydraulic pressure, the first hydraulic passage switching valve RLV1 performs switching to a hydraulic passage 57 connecting an input hydraulic passage 56, to which the output hydraulic pressure of the second transmission shift hydraulic pressure control valve SLC2 has been supplied, to the second output hydraulic passage 60 which supplies hydraulic pressure to the second clutch C2 or the second brake B2. When the instructed hydraulic pressure is higher than the reference hydraulic pressure, the first hydraulic passage switching valve RLV1 performs switching to a hydraulic passage 59 connecting a second output hydraulic passage 58 of the fifth hydraulic passage switching valve RLV5 to the second output hydraulic passage 60.

When the instructed hydraulic pressure supplied from an output hydraulic passage 61 of a third hydraulic passage switching valve RLV3 is lower than a reference hydraulic pressure, the second hydraulic passage switching valve RLV2 performs switching to a hydraulic passage 62 connecting the second output hydraulic passage 60 of the first hydraulic passage switching valve RLV1 to a first output hydraulic passage 64 supplying the hydraulic pressure to the second clutch C2. When the instructed hydraulic pressure is higher than the reference hydraulic pressure, the second hydraulic passage switching valve RLV2 performs switching to a hydraulic passage 63 connecting the second output hydraulic passage 60 of the first hydraulic passage switching valve RLV1 to a second output hydraulic passage 65 supplying the hydraulic pressure to a fourth hydraulic passage switching valve RLV4.

When the instructed hydraulic pressure supplied from the output hydraulic passage 65 of the second instructed hydraulic pressure control valve S2 is lower than a reference hydraulic pressure, the third hydraulic passage switching valve RLV3 performs switching to a hydraulic passage 67 connecting an input hydraulic passage 66 connected to discharge port EX of working oil to the output hydraulic passage 61 supplying the instructed hydraulic pressure to the second hydraulic passage switching valve RLV2. When the instructed hydraulic pressure is higher than the reference hydraulic pressure, the third hydraulic passage switching valve RLV3 performs switching to a hydraulic passage 68 connecting the output hydraulic passage 50 to which the output hydraulic pressure of the first instructed hydraulic pressure control valve S1 has been supplied to the output hydraulic passage 61 supplying the instructed hydraulic pressure to the second hydraulic passage switching valve RLV2.

When the instructed hydraulic pressure supplied from the output hydraulic passage 65 of the second instructed hydraulic pressure control valve S2 is lower than a reference hydraulic pressure, the fourth hydraulic passage switching valve RLV4 performs switching to a hydraulic passage 71 connecting an input hydraulic passage 70 to which the reverse range pressure PREV from the manual valve MNV has been supplied to an output hydraulic passage 73 supplying the hydraulic pressure to the second brake B2. When the instructed hydraulic pressure is higher than the reference hydraulic pressure, the fourth hydraulic passage switching valve RLV4 performs switching to a hydraulic passage 72 connecting the second output hydraulic passage 65 of the second hydraulic passage switching valve RLV2 to an output hydraulic passage 73 supplying the hydraulic pressure to the second brake B2.

When the pushing force according to the first instructed hydraulic pressure supplied from the first output hydraulic passage 64 of the second hydraulic passage switching valve RLV2 supplying the hydraulic pressure to the second clutch C2 is higher than the pushing force according to a third instructed hydraulic pressure supplied from the first output hydraulic passage 55 of the first hydraulic passage switching valve RLV1 supplying the hydraulic pressure to the first clutch C1 or the second instructed hydraulic pressure supplied from the output hydraulic passage 65 of the second instructed hydraulic pressure control valve S2, the fifth hydraulic passage switching valve RLV5 performs switching to a hydraulic passage 76 connecting an input hydraulic passage 75 to which the forward range pressure PD from the manual valve MNV has been supplied to the second output hydraulic passage 58 supplying the hydraulic pressure to the second clutch C2 or the second brake B2. In contrast, when the pushing force according to the first instructed hydraulic pressure supplied from the first output hydraulic passage 64 of the second hydraulic passage switching valve RLV2 supplying the hydraulic pressure to the second clutch C2 is lower than the pushing force according to a third instructed hydraulic pressure supplied from the first output hydraulic passage 55 of the first hydraulic passage switching valve RLV1 supplying the hydraulic pressure to the first clutch C1 or the second instructed hydraulic pressure supplied from the output hydraulic passage 65 of the second instructed hydraulic pressure control valve S2, the fifth hydraulic passage switching valve RLV5 performs switching to a hydraulic passage 77 connecting the input hydraulic passage 75 to which the forward range pressure PD from the manual valve MNV has been supplied to the first output hydraulic passage 53 supplying the hydraulic pressure to the first clutch C1.

The fifth hydraulic passage switching valve RLV5 is equivalent to the "fail use hydraulic passage switching valve" in the disclosure and the second instructed hydraulic pressure control valve S2 is equivalent to the "hydraulic pressure control valve" in the disclosure. That is, the fifth hydraulic passage switching valve RLV5 is a fail use hydraulic passage switching valve that switches the engagement device to which the hydraulic pressure of the hydraulic pressure source is supplied during occurrence of a hydraulic control fail (electric power interruption) disabling the hydraulic pressure control device PC from functioning normally and the second instructed hydraulic pressure control valve S2 is a hydraulic pressure control valve that controls the hydraulic pressure supplied as the second instructed hydraulic pressure to the fifth hydraulic passage switching valve RLV5, which is a fail use hydraulic pressure switching valve.

The output hydraulic pressure of the third transmission shift hydraulic pressure control valve SLC3 is supplied to the third clutch C3 by bypassing the hydraulic passage switching valve. The output hydraulic pressure of the fourth transmission shift hydraulic pressure control valve SLB1 is supplied to the first brake B1 by bypassing the hydraulic passage switching valve.

<Switching Between ON and OFF of S1 and S2>
<During Normal Travel>

Figures 8, 9:
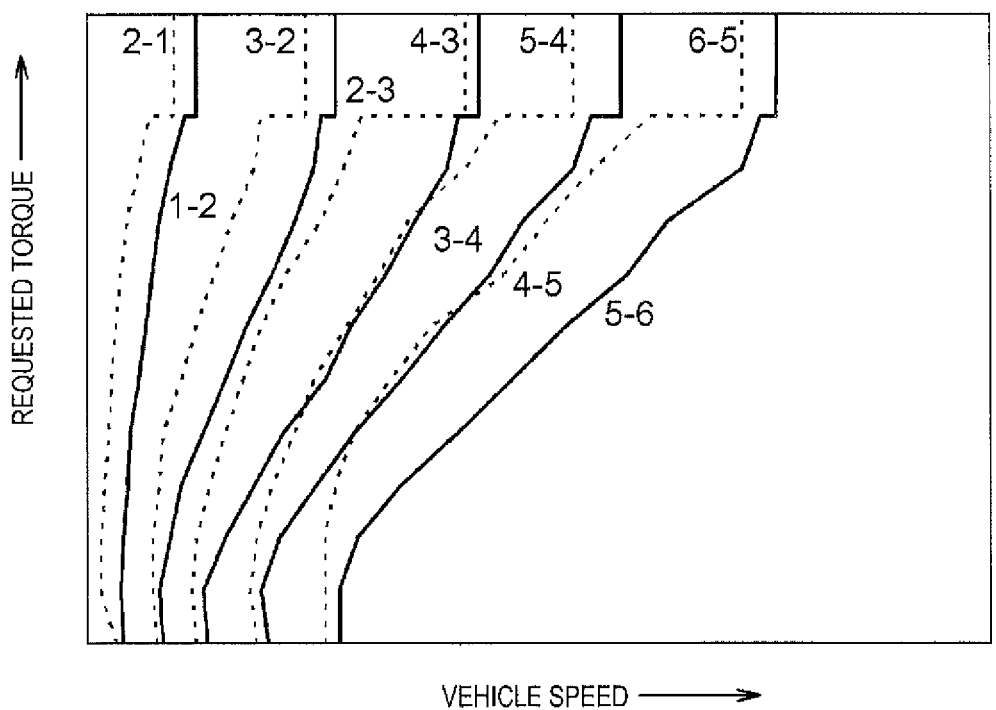
FIG. 8 is an operation table for an instructed hydraulic pressure control valve according to the embodiment of the disclosure.
FIG. 9 is a transmission shift map according to the embodiment of the disclosure.

As illustrated in FIG. 8, during normal travel in which the D range or the R range is formed as a transmission shift stage in the transmission apparatus TM, the control device 30 supplies (ON) electric power to close the first instructed hydraulic pressure control valve S1 and does not supply (OFF) electric power to close the second instructed hydraulic pressure control valve S2. This performs switching to a hydraulic passage 57 and the hydraulic passage 52 in the first hydraulic passage switching valve RLV1 and switching to the hydraulic passage 62 in the second hydraulic passage switching valve RLV2. Accordingly, in the case of the D range, the output hydraulic pressure of the first transmission shift hydraulic pressure control valve SLC1 is supplied to the first clutch C1 via the hydraulic passage 52 of the first hydraulic passage switching valve RLV1 and the output hydraulic pressure of the second transmission shift hydraulic pressure control valve SLC2 is supplied to the second clutch C2 via the hydraulic passage 57 of the first hydraulic passage switching valve RLV1 and the hydraulic passage 62 of the second hydraulic passage switching valve RLV2.

<Formation of the First Stage During Engine Braking>

When forming the first stage (1st) for engine braking, the control device 30 does not supply (OFF) electric power to the first instructed hydraulic pressure control valve S1 to open the first instructed hydraulic pressure control valve S1 and supplies (ON) electric power to the second instructed hydraulic pressure control valve S2 to open the second instructed hydraulic pressure control valve S2. This performs switching to the hydraulic passage 62 in the second hydraulic passage switching valve RLV2, switching to the hydraulic passage 68 in the third hydraulic passage switching valve RLV3, and switching to the hydraulic passage 72 in the fourth hydraulic passage switching valve RLV4. On the other hand, the first hydraulic passage switching valve RLV1 has a switching hydraulic passage (not illustrated) that supplies the output hydraulic pressure of the first transmission shift hydraulic pressure control valve SLC1 to the spring side of the first hydraulic passage switching valve RLV1 as an instructed hydraulic pressure when the hydraulic passages 52 and 57 are selected. The pressing force according to the instructed hydraulic pressure from the first transmission shift hydraulic pressure control valve SLC1 supplied to the spring side by the switching hydraulic passage (not illustrated) and the spring competes against the pressing force according to the instructed hydraulic pressure from the first instructed hydraulic pressure control valve S1 to maintain the hydraulic passage 52 and the hydraulic passage 57 in the first hydraulic passage switching valve RLV1. Accordingly, the output hydraulic pressure of the first transmission shift hydraulic pressure control valve SLC1 is supplied to the first clutch C1 via the hydraulic passage 52 of the first hydraulic passage switching valve RLV1 and the output hydraulic pressure of the second transmission shift hydraulic pressure control valve SLC2 is supplied to the second brake B2 via the hydraulic passage 57 of the first hydraulic passage switching valve RLV1, the hydraulic passage 63 of the second hydraulic passage switching valve RLV2, and the hydraulic passage 72 of the fourth hydraulic passage switching valve RLV4 to form the first stage (1st).

<R Range During Forward Travel>

When the driver selects the R range during forward travel with a vehicle speed larger than 0 in the forward direction, the control device 30 closes the first instructed hydraulic pressure control valve S1 by supplying (ON) electric power to the first instructed hydraulic pressure control valve S1 and opens the second instructed hydraulic pressure control valve S2 by supplying electric power to the second instructed hydraulic pressure control valve S2 to prevent the formation of the reverse stage (Rev). This performs switching to the hydraulic passage 72 in the fourth hydraulic passage switching valve RLV4. The second brake B2 is supplied with the reduced output hydraulic pressure of the second transmission shift hydraulic pressure control valve SLC2 instead of the reverse range pressure PREV via the hydraulic passage 57 of the first hydraulic passage switching valve RLV1, the hydraulic passage 63 of the second hydraulic passage switching valve RLV2, and the hydraulic passage 72 of the fourth hydraulic passage switching valve RLV4, so the second brake B2 is released and the reverse stage (Rev) is not formed.

3. Structures of the Control Devices

Next, the structures of the control device 30 and the internal combustion engine control device 31 for controlling the vehicle driving device 1 will be described with reference to FIG. 3.

The control units 32 to 34 of the control device 30 and the internal combustion engine control device 31 have calculation processing units (computers) such as CPUs as core members and storage devices such as RAMs (random access memory) and ROMs (read-only memory). The calculation processing units can write data to or read data from RAMs and can read data from ROMs. In addition, functional portions 41 to 46 and the like of the control device 30 are configured by software (programs) stored in the ROMs and the like, hardware such as computing circuits provided separately, or both of them. In addition, the control units 32 to 34 of the control device 30 and the internal combustion engine control device 31 are configured so as to communicate with each other, share various types of information such as detected information by sensors and control parameters, and perform cooperative control to achieve the functions of the functional portions 41 to 46.

In addition, the vehicle driving device 1 has sensors such as sensors Se1 to Se5 and electric signals output from the sensors are input to the control device 30 and the internal combustion engine control device 31. The control device 30 and the internal combustion engine control device 31 calculate the detected information by the sensors based on the input electric signals.

The input rotation speed sensor Se1 detects the rotation speed of the input shaft I. The control device 30 detects the rotation speed (angular speed) of the input shaft I based on an input signal from the input rotation speed sensor Se1. The output rotation speed sensor Se2 detects the rotation speed of the output gear O. The control device 30 detects the rotation speed (angular speed) of the output gear O based on an input signal from the output rotation speed sensor Se2. In addition, since the rotation speed of the output gear O is proportional to the vehicle speed, the control device 30 calculates the vehicle speed based on an input signal from the output rotation speed sensor Se2. The engine rotation speed sensor Se3 detects the rotation speed of the internal combustion engine output shaft Eo (internal combustion engine ENG). The internal combustion engine control device 31 calculates the rotation speed (angular speed) of the internal combustion engine ENG based on an input signal from the engine rotation speed sensor Se3.

The shift position sensor Se4 detects the selected position (shift position) of the shift lever SL operated by the driver. The control device 30 detects the shift position based on an input signal from the shift position sensor Se4. In the shift lever SL, a parking range (P range), reverse travel range (R range), neutral range (N range), forward travel range (D range), or the like can be selected. In addition, in the shift lever SL, as one type of the D range, a transmission shift stage restriction range such as 2 range or L range that restrict forward transmission shift stages to be formed can be selected. In addition, in the shift lever SL, it is possible to operate an "up-shift request switch" requesting the transmission apparatus TM to shift up or a "down-shift request switch" requesting the transmission apparatus TM to shift down when the D range is selected.

The accelerator opening sensor Se5 detects the amount of operation of an accelerator pedal. The control device 30 detects the accelerator opening based on an input signal from the accelerator opening sensor Se5.

3-1. Vehicle Control Unit 34

The vehicle control unit 34 includes the integrated control portion 46. The integrated control portion 46 makes control so as to integrate, as the entire vehicle, various types of torque control performed on the internal combustion engine ENG, the rotary electric machine MG, the transmission apparatus TM, the lock-up clutch LC, and the like and the engagement control of engagement devices.

Based on the accelerator opening, the vehicle speed, the charge amount of the battery, and the like, the integrated control portion 46 calculates the vehicle request torque, which is the torque requested to drive the wheels W and the target driving force to be transferred to the wheels W from the internal combustion engine ENG and the rotary electric machine MG as the first driving force source and the second driving force source, and determines the operation mode of the internal combustion engine ENG and the rotary electric machine MG. The operation mode includes an electric mode used for travel using only the driving force of the rotary electric machine MG and a parallel mode for travel using at least the driving force of the internal combustion engine ENG. For example, when the accelerator opening is small and the charge amount of the battery is large, the electric mode is selected as the operation mode. Otherwise (that is, when the accelerator opening is large or the charge amount of the battery is small), the parallel mode is selected as the operation mode.

In addition, based on the vehicle request torque, the operation mode, the charge amount of the battery, and the like, the integrated control portion 46 calculates an internal combustion engine request torque, which is an output torque for requesting the internal combustion engine ENG, a rotary electric machine request torque, which is an output torque for requesting the rotary electric machine MG, a hydraulic pressure instruction, which is the target of a hydraulic pressure supplied to the lock-up clutch LC, and the target transmission shift stage of the transmission apparatus TM and performs integrated control by instructing them to the other control units 32 and 33 and the internal combustion engine control device 31. Note that the internal combustion engine request torque is proportional to the accelerator opening when the parameters other than the accelerator opening, such as the vehicle speed, the charge amount of the battery, and the like are not changed in the parallel mode.

<Determination of a Target Transmission Shift Stage>

The integrated control portion 46 determines a target transmission shift stage in the transmission apparatus TM based on the vehicle speed, the transmission shift input request torque, and the shift position. This transmission shift input request torque is the request torque of the first driving force source transferred to the input shaft I of the transmission apparatus TM and the internal combustion engine request torque in the embodiment.

The integrated control portion 46 determines the target transmission shift stage based on the vehicle speed and the internal combustion engine request torque with reference to a transmission shift map stored in the ROM or the like as illustrated in FIG. 9. The transmission shift map includes a plurality of upshift lines (solid lines) and a plurality of downshift lines (dashed lines) and, when an upshift line or a downshift line is straddled in the transmission shift map due to a change in the vehicle speed and the transmission shift input request torque (the internal combustion engine request torque in this example), the integrated control portion 46 determines a new target transmission shift stage in the transmission apparatus TM. Numbers adjacent to the shift lines FIG. 9 indicate transmission shift stages from the first stage to the sixth stage and, for example, "5-6" indicates an upshift from the fifth stage to the sixth stage and "6-5" indicates a downshift from the sixth stage to the fifth stage.

When a transmission shift stage restriction range such as "2 range" or "L range" is selected as the shift position, the integrated control portion 46 determines the transmission shift stage that can be selected in each range as the target transmission shift stage using the transmission shift map corresponding to each range and based on the vehicle speed and the internal combustion engine request torque. When "R range" is selected, the integrated control portion 46 determines the reverse stage (Rev) as the target transmission shift stage. When "P range" or "N range" is selected, the integrated control portion 46 determines, as the target transmission shift stage, the released neutral state for releasing all engagement devices C1, C2, . . . . For convenience sake, this released neutral state is referred to as a released neutral stage.

In addition, the integrated control portion 46 may change the target transmission shift stage when an upshift request or downshift request is made due to a change in the shift position by the driver. A downshift means a change from a transmission shift stage having a smaller transmission shift ratio to a transmission shift stage having a larger transmission shift ratio and an upshift means a change from a transmission shift stage having a larger transmission shift ratio to a transmission shift stage having a smaller transmission shift ratio.

3-2. Internal Combustion Engine Control Device 31

The internal combustion engine control device 31 has the internal combustion engine control portion 41 controlling the operation of the internal combustion engine ENG. In the embodiment, when the internal combustion engine request torque is instructed from the integrated control portion 46, the internal combustion engine control portion 41 makes torque control so that the internal combustion engine ENG outputs the internal combustion engine request torque.

3-3. Rotary Electric Machine Control Unit 32

The rotary electric machine control unit 32 has a rotary electric machine control portion 42 controlling the operation of the rotary electric machine MG. In the embodiment, when the rotary electric machine request torque is instructed from the integrated control portion 46, the rotary electric machine control portion 42 makes control so that the rotary electric machine MG outputs the rotary electric machine request torque. Specifically, the rotary electric machine control portion 42 controls the output torque of the rotary electric machine MG by turning on and off a plurality of switching elements included in an inverter.

3-4. Power Transfer Control Unit 33

The power transfer control unit 33 includes a transmission shift control portion 43 controlling the transmission apparatus TM and a lock-up control portion 45 controlling the lock-up clutch LC.

3-4-1. Lock-Up Control Portion 45

The lock-up control portion 45 controls the state of engagement of the lock-up clutch LC. In the embodiment, the lock-up control portion 45 controls signal values supplied to the linear solenoid valves included in the hydraulic pressure control device PC so that the hydraulic pressure supplied to the lock-up clutch LC matches the hydraulic pressure instruction of the lock-up clutch LC issued from the integrated control portion 46.

3-4-2. Transmission Shift Control Portion 43

The transmission shift control portion 43 controls the state of the transmission apparatus TM by controlling the engagement and release of the plurality of engagement devices C1, B1, . . . included in the transmission apparatus TM.

In the embodiment, the transmission shift control portion 43 controls the hydraulic pressures supplied to the plurality of engagement devices C1, B1, . . . included in the transmission apparatus TM via the hydraulic pressure control device PC, engages or releases the engagement devices C1, B1, . . . , and forms the target transmission shift stage instructed from the integrated control portion 46 in the transmission apparatus TM. Specifically, the transmission shift control portion 43 instructs the target hydraulic pressures (hydraulic pressure instructions) of the engagement devices to the hydraulic pressure control device PC and the hydraulic pressure control device PC supplies the hydraulic pressures according to the instructed target hydraulic pressures (hydraulic pressure instructions) to the engagement devices. In the embodiment, the transmission shift control portion 43 controls the hydraulic pressures supplied to the engagement devices by controlling the signal values supplied to the hydraulic pressure control valves SLT, SLC1, SLC2, . . . , S1, S2 included in the hydraulic pressure control device PC.

When performing transmission shift control for switching between transmission shift stages, the transmission shift control portion 43 controls the hydraulic pressure instructions for the engagement devices C1, B1, . . . , engages or releases the engagement devices C1, B1, . . . , and switches the transmission shift stage formed by the transmission apparatus TM to the target transmission shift stage. At this time, the transmission shift control portion 43 sets the release side engagement device, which is the engagement device to be released for switching between transmission shift stages, and the engagement side engagement device, which is the engagement device to be engaged for switching between transmission shift stages. Then, the transmission shift control portion 43 performs a so-called switching transmission shift in which the release side engagement device is released and the engagement side engagement device is engaged according to a planned transmission shift control sequence.

3-4-2-1. Neutral Travel Control Portion 44

The transmission shift control portion 43 has the neutral travelling control portion 44.

The neutral travel control portion 44 performs neutral travel control for putting the transmission apparatus TM in the neutral state in which no power is transferred, during rotation of the wheels W.

In the neutral state, no transmission shift stage is formed in the transmission apparatus TM and power is not transferred between the input shaft I and the output gear O of the transmission apparatus TM.

First, neutral travel control is performed when the wheels W are rotated using the driving force of the rotary electric machine MG without using the driving force of the internal combustion engine ENG. In the embodiment, neutral travel control is performed during execution of the electric mode, which will be described later. During neutral travel control, drivable coupling between the internal combustion engine ENG and the wheels W is put in the non-coupling state and the internal combustion engine ENG is rotatably driven by the rotation of the wheels W, so a negative torque is prevented from being transferred to the wheels W.

Secondly, neutral travel control is performed when entering a predetermined gradual speed reducing state in which the vehicle request torque is very small relative to the vehicle travel resistance according to the vehicle speed and the like during the rotation of the wheels W and in which at least the driving force of the internal combustion engine ENG is used to rotate the wheels W (the state in which the parallel mode, which will be described later, is entered in this example). During neutral travel control, drivable coupling between the internal combustion engine ENG and the wheels W is put in the non-coupling state and the vehicle is put in the idle travel state. During the neutral travel control, engine braking does not operate and gradual reduction in the vehicle speed is achieved by vehicle travel resistances. The state in which the engine braking operates means the state in which the internal combustion engine ENG is rotatably driven by the rotation of the wheels W and a negative driving force is transferred to the output gear O by the rotary resistance of the internal combustion engine ENG.

<Determination of a Neutral Travel Control Condition>

First, the neutral travel control portion 44 determines that the neutral travel control condition is met in the case in which (when the electric mode is entered in this example) the wheels W are rotated using the driving force of the rotary electric machine MG without using the driving force of the internal combustion engine ENG.

Secondary, the neutral travel control portion 44 determines whether the neutral travel control condition is met based on at least the vehicle speed and the driver's request in the state in which (when the parallel mode is entered in this example) the wheels W are rotated using at least the driving force of the internal combustion engine ENG. In the embodiment, the driver's request is made by specifying a transmission shift stage using the accelerator opening and the shift position. In this example, the neutral travel control condition is determined in advance by the vehicle speed, the accelerator opening, and the shift position. For example, the neutral travel control condition determined is that the vehicle speed is larger than zero, the accelerator opening falls within the range set according to the vehicle speed, and the shift position is in the "D range". Making the transmission apparatus TM neutral (no power is transferred) by setting the shift position to the "N range" is not included in the neutral travel control performed by the neutral travel control portion 44. When the neutral travel control condition is met, the neutral travel control portion 44 determines that the neutral travel control condition has been established. On the other hand, if the neutral travel control condition is no longer met when the accelerator opening falls outside a predetermined range because, for example, the driver presses the accelerator pedal, the driver changes the shift position to a range (for example, "2 range" or the like) other than the D range, or an upshift request is made, the neutral travel control portion 44 determines that the neutral travel control condition has become unestablished.

<Switching Between Neutral States>

Based on at least the vehicle speed during neutral travel control, the neutral travel control portion 44 performs switching between the engaged neutral state in which a particular engagement device, which is one of the plurality of engagement devices C1, B1, . . . , is put in the engagement state to put the transmission apparatus TM in the state in which no power is transferred and the released neutral state in which all of the plurality of engagement devices C1, B1, . . . are put in released state to put the transmission apparatus TM in the state in which no power is transferred.

In the structure, a particular engagement device of the plurality of engagement devices C1, B1, . . . is engaged in the engaged neutral state and all engagement devices are put in the release state in the released neutral state. Accordingly, even when switching between the engaged neutral state and the released neutral state is performed due to a change in vehicle speed during neutral travel control, it is not necessary to make a hold change of engagement devices among the plurality of engagement devices C1, B1, . . . . For example, during switching from the engaged neutral state to the released neutral state, it is sufficient to release only the particular engagement device and other engagement devices do not need to be engaged. In contrast, during switching from the released neutral state to the engaged neutral state, it is sufficient to engage only the particular engagement device and other engagement devices do not need to be released.

When a hold change of the engagement devices is made, the rotation speed of a rotary member such as a rotary element of the second planetary gear device P2 included in the transmission apparatus TM needs to be changed. When the rotation speed is changed, an inertial torque by the inertial moment of the rotary member is generated and torque fluctuations may be transferred to the wheels W. When a hold change of engagement devices is made in the minimum time in preparation for a return from neutral travel control to normal travel, the inertial torque may increase. Accordingly, in the above structure, since a hold change of engagement devices is prevented even when switching between the engaged neutral state and the released neutral state is performed, it is possible to suppress the inertial torque from generating and suppress torque fluctuations from being transferred to the wheels W.

<First State Determination Method: Determination of the Neutral State Based on the Return Time Transmission Shift Stage>

First, the case (first state determination method) in which the neutral travel control portion 44 determines whether switching to the engaged neutral state or switching to the released neutral state is performed based on the return time transmission shift stage will be described.

In the embodiment, the neutral travel control portion 44 is configured to perform switching between the engaged neutral state and the released neutral state based on the return time transmission shift stage determined based on at least the vehicle speed as the transmission shift stage formed during returning from the neutral state to the normal transmission shift state at present time in which the transmission apparatus TM forms the transmission shift stage.

In the embodiment, the neutral travel control portion 44 forms the target transmission shift stage in the transmission apparatus TM when the neutral travel control condition is unestablished. Accordingly, the return time transmission shift stage is the target transmission shift stage determined by the integrated control portion 46 based on the vehicle speed, the transmission shift input request torque (the internal combustion engine request torque), and the shift position.

When performing neutral travel control in the electric mode, the neutral travel control portion 44 changes the operation mode from the electric mode to the parallel mode and, based on return time transmission shift stage formed during returning from the neutral state to the normal transmission shift state in which the transmission apparatus TM forms the transmission shift stage, performs switching between the engaged neutral state and the released neutral state. The neutral travel control portion 44 instructs the integrated control portion 46 to calculate an internal combustion engine request torque as described above that is set when switching from the electric mode to the parallel mode is performed and determine the target transmission shift stage based on the vehicle speed, the internal combustion engine request torque (transmission shift input request torque), and the shift position. Then, the neutral travel control portion 44 sets the target transmission shift stage to the return time transmission shift stage.

In the embodiment, the neutral travel control portion 44 determines whether the return time transmission shift stage is included in high transmission shift ratio stages, which are one or more predetermined transmission shift stages, or low transmission shift ratio stages, which are one or more transmission shift stages having transmission shift ratios lower than the high transmission shift ratio stages.

When the determination result indicates the high transmission shift ratio stages, the neutral travel control portion 44 determines switching to the released neutral state. When the determination result indicates the low transmission shift ratio stages, the neutral travel control portion 44 determines switching to the engaged neutral state.

Figures 10, 11:
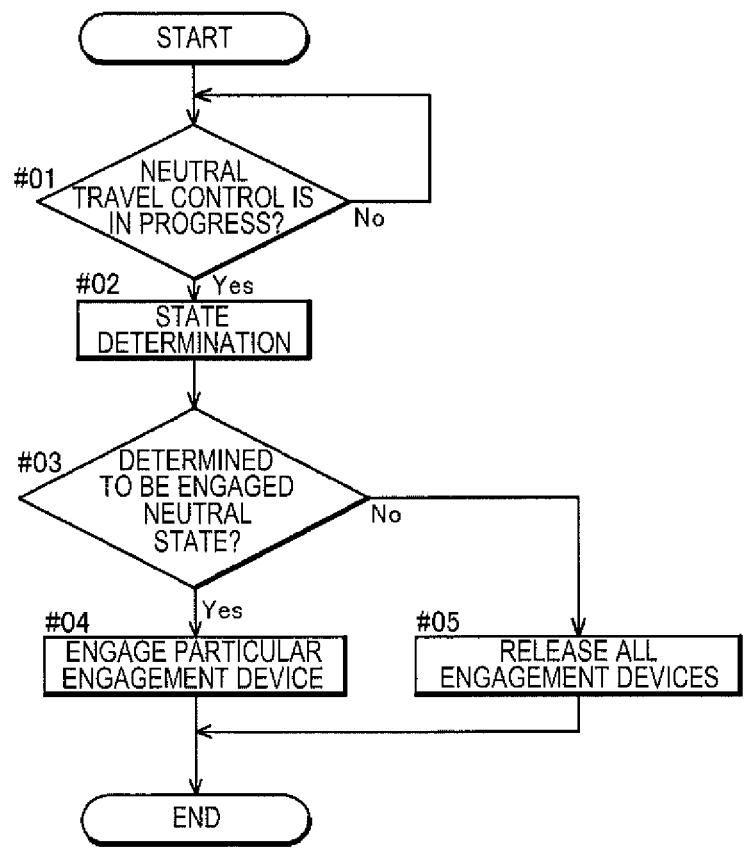
FIG. 10 is a flowchart illustrating neutral travel control according to the embodiment of the disclosure.
FIG. 11 illustrates a first state determination method according to the embodiment of the disclosure.

In the embodiment, as illustrated in FIG. 11, the first stage 1st, the second stage 2nd, and the third stage 3rd are set as high speed transmission shift stages having high transmission shift ratios and the fourth stage 4th, the fifth stage 5th, and the sixth stage 6th are set as low transmission shift ratio stages having low transmission shift ratios.

In the transmission apparatus TM, a common engagement device is engaged in a plurality of transmission shift stages determined to be the low transmission shift ratio stages. In the embodiment, the second clutch C2 is engaged in common in the fourth stage 4th, the fifth stage 5th, and the sixth stage 6th determined to be low transmission shift ratio stages. The particular engagement device is an engagement device engaged in common in a plurality of the return time transmission shift stages determined to be low transmission shift ratio stages. In the embodiment, the particular engagement device is the second clutch C2 engaged in common in the fourth stage 4th, the fifth stage 5th, and the sixth stage 6th, which are the plurality of return time transmission shift stages determined to be low transmission shift ratio stages.

In this structure, when a return from the neutral travel control to the normal travel is made in the state in which the return time transmission shift stages are determined to be the low transmission shift ratio stages, since a common engagement device (the second clutch C2) of the plurality of transmission shift stages determined to be the low transmission shift ratio stages has been already engaged as the particular engagement device, only if the engagement devices other than the common engagement device (the second clutch C2) are engaged, the return time transmission shift stages can be formed early in the transmission apparatus TM.

Note that, in the transmission apparatus TM, a common engagement device is engaged even in a plurality of transmission shift stages determined to be high transmission shift ratio stages. In the embodiment, the first clutch C1 is engaged in common in the first stage 1st, the second stage 2nd, and the third stage 3rd determined to be high transmission shift ratio stages.

However, since all engagement devices are released in the released neutral state, the engagement device (the first clutch C1 in this example) engaged in common in the plurality of return time transmission shift stages determined to be high transmission shift ratio stages is not set to a particular engagement device.

<Second State Determination Method: Determination of the Neutral State Based on the Return Time Transmission Shift Stage and Vehicle Speed>

Next, the case (second state determination method) in which the neutral travel control portion 44 determines whether switching to the engaged neutral state or the released neutral state is performed based on the return time transmission shift stage and vehicle speed will be described.

In this case, in addition to the determination of return time transmission shift stages and the determination of the high transmission shift ratio stage or the low transmission shift ratio stage described above, the neutral travel control portion 44 determines whether the vehicle speed is in a predetermined low vehicle speed range or a high vehicle speed range higher than the low vehicle speed range.

In the embodiment, the neutral travel control portion 44 determines that the vehicle speed is in the low vehicle speed range when the vehicle speed is lower than a predetermined determination speed or the vehicle speed is in the high vehicle speed range when the vehicle speed is higher than the predetermined determination speed. The determination speed is set to, for example, 80 km/h.

In the case in which (when the parallel mode is entered in this example) the wheels W are rotated using at least the driving force of the internal combustion engine ENG, if the determination result indicates the low vehicle speed range and the high transmission shift ratio stage, the neutral travel control portion 44 determines switching to the released neutral state. Otherwise, the neutral travel control portion 44 determines switching to the engaged neutral state.

That is, when the determination result indicates the high vehicle speed range or the low transmission shift ratio stage, the neutral travel control portion 44 determines that switching to the engaged neutral state is preceded.

Note that the particular engagement device is the engagement device (the second clutch C2 in this example) engaged in common in the plurality of return time transmission shift stages determined to be low transmission shift ratio stages as described above.

Such a structure is adopted to prevent a negative torque of engine braking from being transferred to the wheels W if a high transmission shift ratio stage is formed in the state in which the vehicle speed is high and the rotation speed of the internal combustion engine ENG suddenly increase when one transmission shift stage (the third stage in this example) of high transmission shift ratio stages is formed due to occurrence of an electric power interruption (described later) of the hydraulic pressure control device PC in the case in which the vehicle speed is in the high vehicle speed range. That is, in the above structure, when the vehicle speed is in the high vehicle speed range even if the determination result indicates the high transmission shift ratio stage, switching to the engaged neutral state on the low transmission shift ratio stage side is determined, one transmission shift stage (the fifth stage in this example) of low transmission shift ratio stages is formed during occurrence of an electric power interruption of the hydraulic pressure control device PC, and a low transmission shift ratio stage is formed in the state in which the vehicle speed is high, thereby preventing a large negative torque of engine braking from being transferred to the wheels W.

In the state (state in which the electric mode is entered in this example) in which the wheels W are rotated using the driving force of the rotary electric machine MG without using the driving force of the internal combustion engine ENG, the neutral travel control portion 44 performs switching to the engaged neutral state when at least the high vehicle speed range and the low transmission shift ratio stage are indicated.

Note that the particular engagement device is the engagement device (the second clutch C2 in this example) engaged in common in the plurality of return time transmission shift stages determined to be low transmission shift ratio stages, as described above.

In this structure, when, for example, a return to the normal transmission shift state is performed to transfer the driving force of the internal combustion engine ENG to the wheels W or when a hydraulic control fail occurs, a low transmission shift ratio stage can be formed in the state in which the vehicle speed is high and the vehicle request torque is high. Accordingly, it is possible to prevent the rotation speed of the internal combustion engine ENG from suddenly increasing and a large negative torque from being transferred to the wheels.

In the embodiment, the neutral travel control portion 44 makes a shift to the engaged neutral state in the case of the high vehicle speed range and the high transmission shift ratio stage and in the case of the low vehicle speed range and the low transmission shift ratio stage and makes a shift to the released neutral state in the case of the low vehicle speed range and the high transmission shift ratio stage.

In addition, as in the first state determination method, when performing neutral travel control in the electric mode, the neutral travel control portion 44 changes the operation mode from the electric mode to the parallel mode and, based on a return time transmission shift stage formed during returning from the neutral state to the normal transmission shift state in which the transmission shift stage is formed in the transmission apparatus TM, performs switching between the engaged neutral state and the released neutral state. The neutral travel control portion 44 instructs the integrated control portion 46 to calculate an internal combustion engine request torque as described above that is set when switching from the electric mode to the parallel mode is performed and determine the target transmission shift stage based on the vehicle speed, the internal combustion engine request torque (transmission shift input request torque), and the shift position. Then, the neutral travel control portion 44 sets the target transmission shift stage to the return time transmission shift stage.

<Flowchart>

Next, the processing of neutral travel control will be described with reference to the flowchart in FIG. 10.

First, the neutral travel control portion 44 determines whether the neutral travel control condition is met as described above in step #01. When the neutral travel control condition is met (Yes in step #01), the neutral travel control portion 44 determines the neutral state (the engaged neutral state or the released neutral state) to be entered (step #02). This determination is performed by the first state determination method or the second state determination method as described above.

When it is determined that switching to the engaged neutral state is performed (Yes in step #03), the neutral travel control portion 44 causes the particular engagement device to be engaged as described above and the other engage devices to be released (step #04).

In contrast, when it is determined that switching to the released neutral state is performed (No in step #03), the neutral travel control portion 44 releases all engagement devices C1, B1, . . . as described above (step #05). The neutral travel control portion 44 repeats the processing from step #01 to step #05 until the neutral travel control condition becomes unestablished (No in step #01).

3-4-2-2. Controlling the Hydraulic Pressure Control Device PC During Neutral Travel Control Next, the control of the hydraulic pressure control device PC according to the embodiment during neutral travel control will be described in detail.

3-4-2-2-1. Engaged Neutral State

In the engaged neutral state, the neutral travel control portion 44 causes only the particular engagement device (the second clutch C2 in this example) of a plurality of engagement devices C1, B1, . . . to be engaged.

Figure 13:
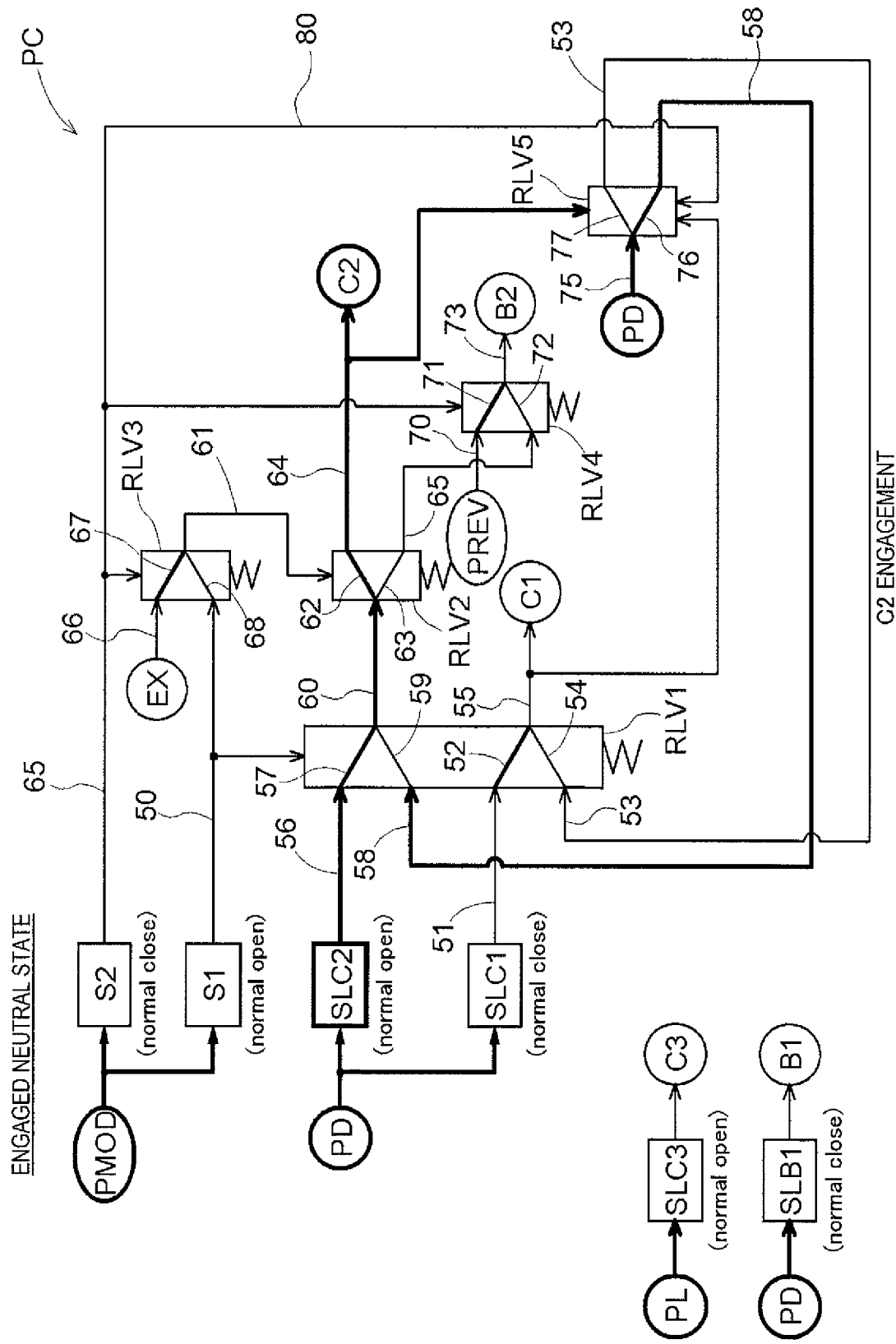
FIG. 13 schematically illustrates the hydraulic circuit of the hydraulic pressure control device according to the embodiment of the disclosure in an engaged neutral state.

The state of the hydraulic pressure control device PC according to the embodiment in the engaged neutral state is illustrated in FIG. 13.

In FIGS. 12 to 17, the hydraulic passages indicated by bolded lines indicate that the hydraulic pressure from the hydraulic pressure source is supplied. In contrast, the hydraulic passages indicated by thin lines indicate that the hydraulic pressure from the hydraulic pressure source is not supplied. In addition, in FIGS. 12 to 17, switching passages indicated by bolded lines are selected in the hydraulic passage switching valves RLV1, RLV2, . . . .

To supply the output hydraulic pressure of the second transmission shift hydraulic pressure control valve SLC2 to the second clutch C2, as illustrated in FIG. 8, the neutral travel control portion 44 supplies (ON) electric power to the first instructed hydraulic pressure control valve S1 as in the normal travel even in the engaged neutral state to close the valve and does not supply (OFF) electric power to the second instructed hydraulic pressure control valve S2 to close the valve.

Specifically, switching to the hydraulic passage 57 and the hydraulic passage 52 is performed in the first hydraulic passage switching valve RLV1 and switching to the hydraulic passage 62 is performed in the second hydraulic passage switching valve RLV2. Accordingly, the output hydraulic pressure of the second transmission shift hydraulic pressure control valve SLC2 is supplied to the second clutch C2 via the hydraulic passage 57 of the first hydraulic passage switching valve RLV1 and the hydraulic passage 62 of the second hydraulic passage switching valve RLV2.

In addition, the fifth hydraulic passage switching valve RLV5 is a fail use hydraulic passage switching valve switching the engagement device to which the hydraulic pressure of the hydraulic pressure source is supplied during occurrence of a hydraulic control fail (electric power interruption) disabling the hydraulic pressure control device PC from functioning normally. In the embodiment, the fifth hydraulic passage switching valve RLV5 switches the engagement device to which the hydraulic pressure of the hydraulic pressure source is supplied between the first clutch C1 and the second clutch C2 during occurrence of a hydraulic control fail (electric power interruption).

A hydraulic control fail (electric power interruption) occurs when the connector connecting the control device 30 with the hydraulic pressure control device PC is disconnected, when the power supply circuit supplying electric power to the hydraulic pressure control device PC in the control device 30 fails, or when connection between the control device 30 and the battery 24 is detached.

In the fifth hydraulic passage switching valve RLV5, when the hydraulic pressure supplied to the particular engagement device (the second clutch C2) in the engaged neutral state is supplied as the first instructed hydraulic pressure, switching to the hydraulic passage 76 is performed so that the hydraulic pressure (the forward range pressure PD in this example) of the hydraulic pressure source is supplied to the second clutch C2 during occurrence of an electric power interruption.

In the embodiment, the forward range pressure PD is supplied to the input port of the hydraulic passage 59 of the first hydraulic passage switching valve RLV1 via the hydraulic passage 76 of the fifth hydraulic passage switching valve RLV5. The hydraulic passage 59 is a hydraulic passage for power supply interruption on the second clutch C2 side.

Figure 14:
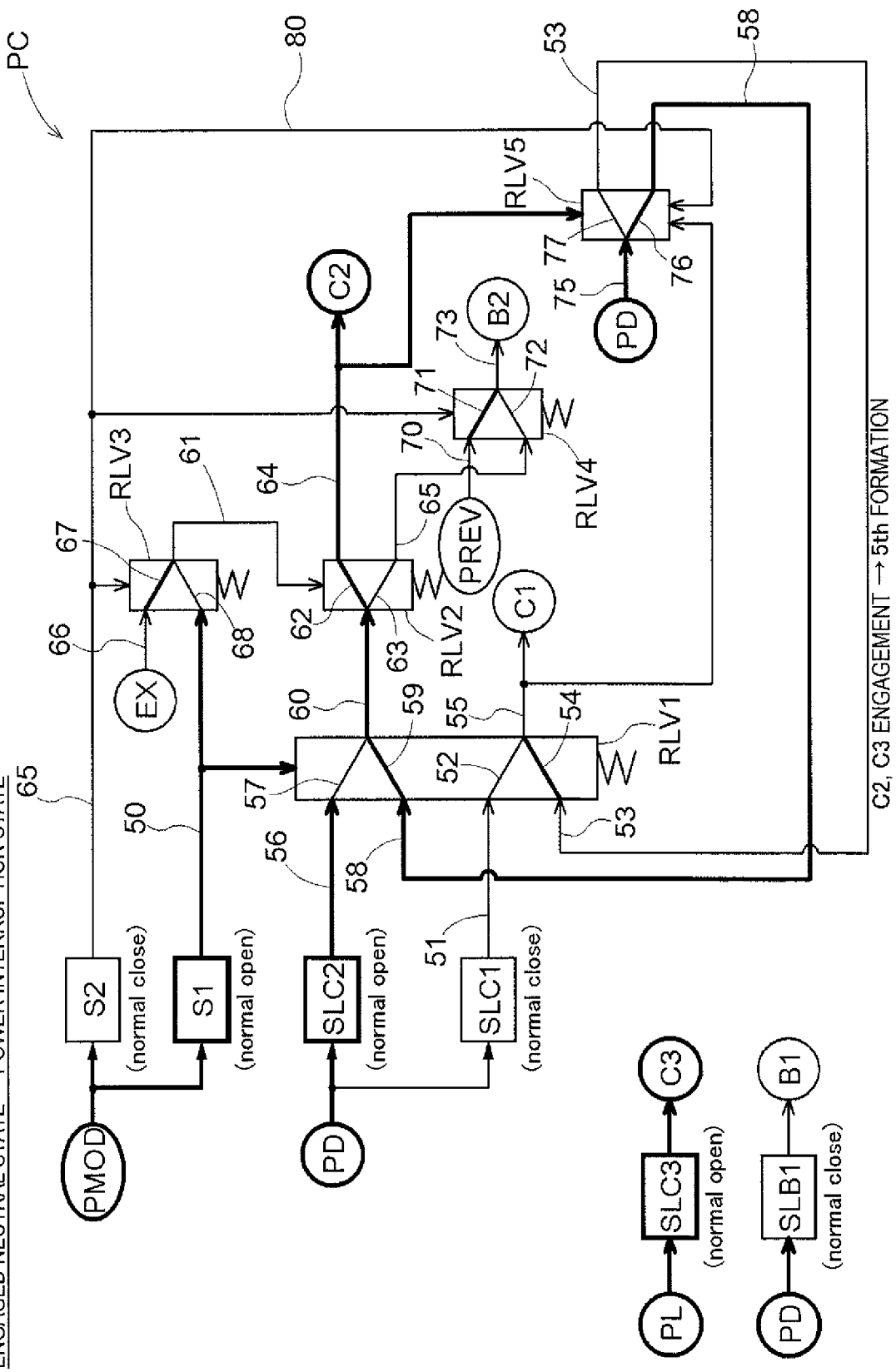
FIG. 14 schematically illustrates the hydraulic circuit of the hydraulic pressure control device according to the embodiment of the disclosure in the power interruption state shifted from the engaged neutral state.

When a hydraulic control fail (electric power interruption) occurs in the engaged neutral state, the hydraulic pressure control device PC is put in the state illustrated in FIG. 14.

In the electric power interruption state, as illustrated in FIG. 8, the first instructed hydraulic pressure control valve S1 is not supplied with electric power (OFF) and opened and the second instructed hydraulic pressure control valve S2 is not supplied with electric power (OFF) and closed. This performs switching to the hydraulic passage 54 and the hydraulic passage 59 in the first hydraulic passage switching valve RLV1 and maintains the hydraulic passage 62 in the second hydraulic passage switching valve RLV2.

In addition, the transmission shift hydraulic pressure control valves SLC1, SLC2, . . . are not supplied with electric power and the first transmission shift hydraulic pressure control valve SLC1 and the fourth transmission shift hydraulic pressure control valve SLB1, which are of normal close type, are closed and do not output the hydraulic pressure of the hydraulic pressure source while the second transmission shift hydraulic pressure control valve SLC2 and the third transmission shift hydraulic pressure control valve SLC3, which are of normal open type, are opened and output the hydraulic pressure of the hydraulic pressure source.

Accordingly, the forward range pressure PD supplied to the input port of the hydraulic passage 59 of the first hydraulic passage switching valve RLV1 before the electric power interruption is supplied to the second clutch C2 via the hydraulic passage 59 of the first hydraulic passage switching valve RLV1 and the hydraulic passage 62 of the second hydraulic passage switching valve RLV2 and the second clutch C2 is engaged as before the electric power interruption. In addition, the output hydraulic pressure of the third transmission shift hydraulic pressure control valve SLC3 is supplied to the third clutch C3 and the third clutch C3 is engaged. Accordingly, when an electric power interruption occurs in the engaged neutral state, the engagement of the second clutch C2 and the third clutch C3 forms the fifth stage (5th).

Accordingly, in the engaged neutral state determined basically in the case of a low transmission shift ratio stage, the fifth stage (one of low transmission shift ratio stages) can be formed during occurrence of a hydraulic control fail (electric power interruption).

Figure 12:
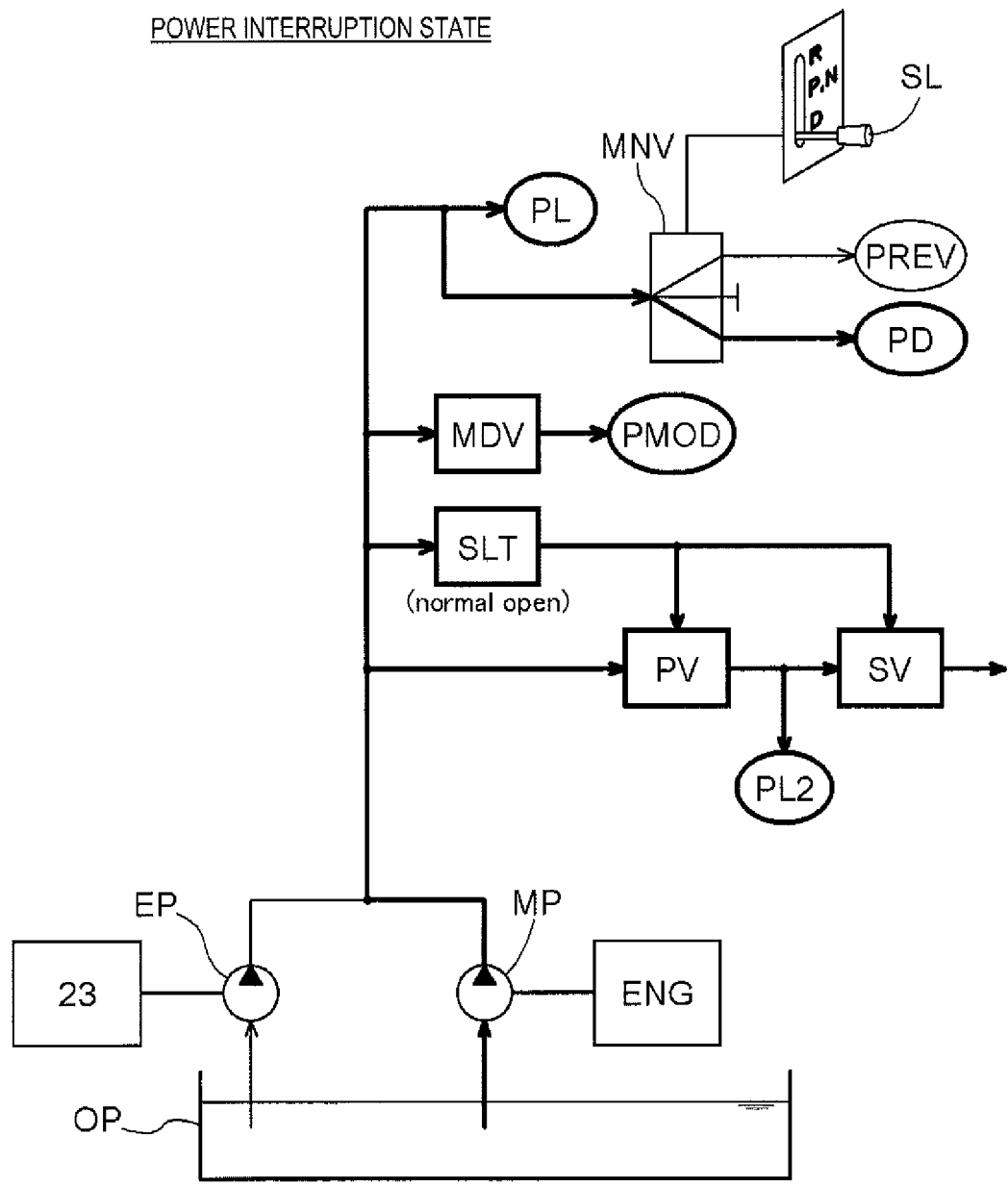
FIG. 12 schematically illustrates the hydraulic circuit of the hydraulic pressure control device according to the embodiment of the disclosure in a power interruption state.

During occurrence of an electric power interruption, the hydraulic pressure source of the hydraulic pressure control device PC is put in the state illustrated in FIG. 12. The line hydraulic pressure control valve SLT is not supplied with electric power, the line hydraulic pressure control valve SLT of normal open type is opened, and the hydraulic pressure of the hydraulic pressure source is output. The line hydraulic pressure control valve SLT is supplied with the hydraulic pressure of the mechanical pump MP discharged by the rotational driving of the internal combustion engine ENG. The instructed hydraulic pressure output from the line hydraulic pressure control valve SLT becomes the maximum pressure in its allowable output range and the line pressure PL and the second line pressure PL2 adjusted by the first regulating valve PV and the second regulating valve SV also become the maximum pressures in their allowable output ranges. Accordingly, even in the electric power interruption state, the line pressure PL is supplied as the forward range pressure PD when the shift position is in the D range. In addition, the modulator hydraulic pressure PMOD generated by receiving the supply of the line pressure PL is the same hydraulic pressure as in the normal state.

3-4-2-2-2. Released Neutral State

The neutral travel control portion 44 releases all of the plurality of engagement devices C1, B1, . . . in the released neutral state.

Comparison Example

First, problems with a comparison example of the embodiment will be described with reference to FIG. 15.

Figure 15:
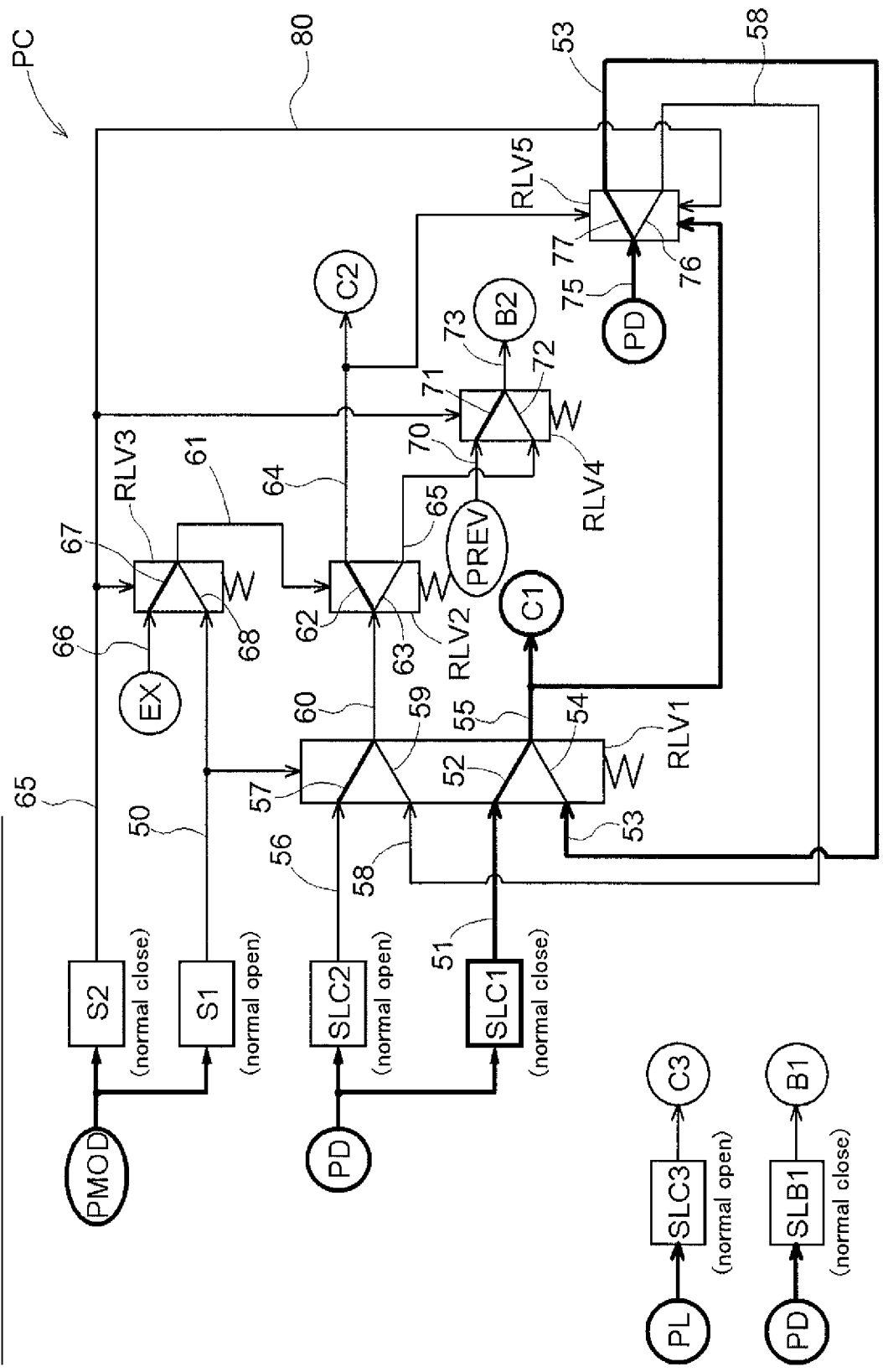
FIG. 15 schematically illustrates the hydraulic circuit of the hydraulic pressure control device according to a comparison example of the disclosure in a released neutral state.

In the comparison example illustrated in FIG. 15, unlike the embodiment, the first clutch C1 is engaged in the released neutral state which is the common engagement device of high transmission shift ratio stages determined to be the released neutral state. Accordingly, as in the engaged neutral state, the first instructed hydraulic pressure control valve S1 is supplied (ON) with electric power and opened and the second instructed hydraulic pressure control valve S2 is not supplied (OFF) with electric power and closed. Then, the output hydraulic pressure of the first transmission shift hydraulic pressure control valve SLC1 is supplied to the first clutch C1 via the hydraulic passage 52 of the first hydraulic passage switching valve RLV1.

In addition, in the fifth hydraulic passage switching valve RLV5 prepared for occurrence of electric power interruption, switching to the hydraulic passage 77 is performed by the hydraulic pressure supplied to the first clutch C1 and the forward range pressure PD is supplied to the input port of the hydraulic passage 54 of the first hydraulic passage switching valve RLV1 via the hydraulic passage 77 of the fifth hydraulic passage switching valve RLV5.

Accordingly, in the comparison example, as in the engaged neutral state, even when an electric power interruption occurs, the forward range pressure PD supplied to the input port of the hydraulic passage 54 of the first hydraulic passage switching valve RLV1 before the electric power interruption is supplied to the first clutch C1 via the hydraulic passage 54 of the first hydraulic passage switching valve RLV1 so that the first clutch C1 can be engaged as before the electric power interruption.

<Use of the Second Instructed Hydraulic Pressure Control Valve S2>

Figure 16:
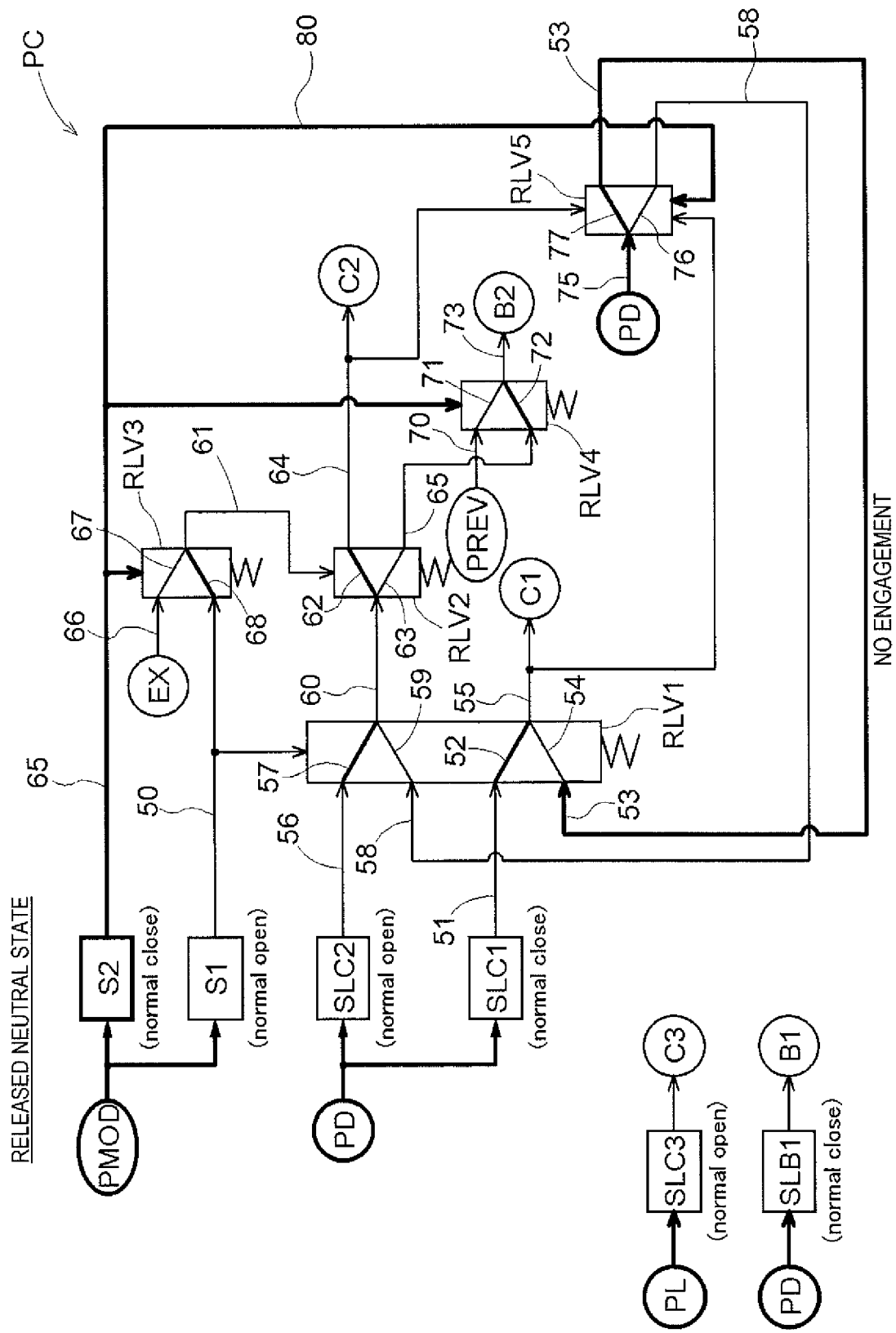
FIG. 16 schematically illustrates the hydraulic circuit of the hydraulic pressure control device according to the embodiment of the disclosure in the released neutral state.

However, since the first clutch C1 is not supplied with the hydraulic pressure as illustrated in FIG. 16 in the released neutral state according to the embodiment, the output hydraulic pressure of the first transmission shift hydraulic pressure control valve SLC1 cannot be supplied to the fifth hydraulic passage switching valve RLV5 as the third instructed hydraulic pressure, unlike the comparison example.

Accordingly, the hydraulic pressure control device PC has the second instructed hydraulic pressure control valve S2 controlling the hydraulic pressure supplied as the second instructed hydraulic pressure, in the fifth hydraulic passage switching valve RLV5, which is a fail use hydraulic pressure switching valve. In the embodiment, as illustrated with reference to FIG. 8, the second instructed hydraulic pressure control valve S2 is provided conventionally to form the first stage by engaging the second brake B2 instead of the one-way clutch F during use of engine braking or to prevent a reverse stage from being formed during a shift to the R range in forward travel. In the embodiment, to supply the output hydraulic pressure of the second instructed hydraulic pressure control valve S2 as the second instructed hydraulic pressure of the fifth hydraulic passage switching valve RLV5, the hydraulic pressure control device PC is provided with a new hydraulic passage 80 for connecting the second instructed hydraulic pressure control valve S2 with the fifth hydraulic passage switching valve RLV5. Since the second instructed hydraulic pressure control valve S2, which is used conventionally for control, is also used in the embodiment, it is not necessary to newly provide a hydraulic pressure control valve specific to the released neutral state.

The neutral travel control portion 44 controls the second instructed hydraulic pressure control valve S2 in the released neutral state to supply the second instructed hydraulic pressure to the fifth hydraulic passage switching valve RLV5. In the embodiment, as illustrated in FIG. 8, the neutral travel control portion 44 supplies (ON) electric power to the first instructed hydraulic pressure control valve S1 in the released neutral state as in the engaged neutral state to close the valve. However, unlike the case in the engaged neutral state, the neutral travel control portion 44 supplies (ON) electric power to the second instructed hydraulic pressure control valve S2 to open the valve. The second instructed hydraulic pressure control valve S2 outputs the hydraulic pressure according to the hydraulic pressure (the modulator hydraulic pressure PMOD in this example) of the hydraulic pressure source and supplies it to the fifth hydraulic passage switching valve RLV5 as the second instructed hydraulic pressure.

In the fifth hydraulic passage switching valve RLV5, the second instructed hydraulic pressure is supplied from the second instructed hydraulic pressure control valve S2 to perform switching to the hydraulic passage 77 so that the hydraulic pressure of the hydraulic pressure source is supplied to one engagement device other than the particular engagement device during occurrence of a hydraulic control fail (electric power interruption). In the embodiment, the one engagement device other than the particular engagement device is the engagement device engaged in common in a plurality of return time transmission shift stages determined to be high transmission shift ratio stages. In this example, the one engagement device other than the particular engagement device is the first clutch C1 engaged in common in the first stage 1st, the second stage 2nd, and the third stage 3rd, which are the plurality of return time transmission shift stages determined to be high transmission shift ratio stages.

In the embodiment, the forward range pressure PD is supplied to the input port of the hydraulic passage 54 of the first hydraulic passage switching valve RLV1 via the hydraulic passage 77 of the fifth hydraulic passage switching valve RLV5. The hydraulic passage 54 is a hydraulic passage prepared for a power supply interruption on the first clutch C1 side.

Figure 17:
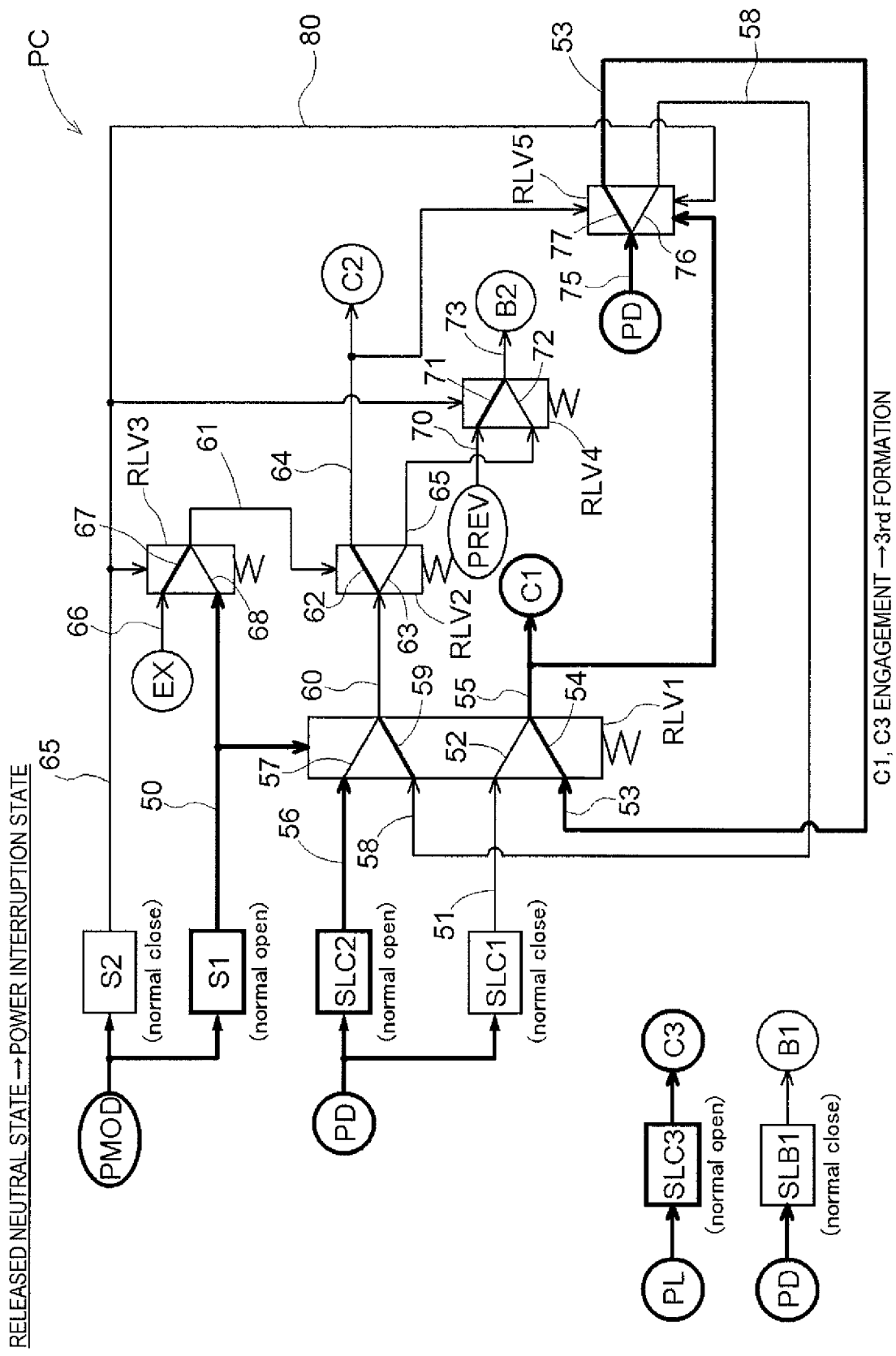
FIG. 17 schematically illustrates the hydraulic circuit of the hydraulic pressure control device according to the embodiment of the disclosure in the power interruption state shifted from the released neutral state.

When a hydraulic control fail (electric power interruption) occurs in the released neutral state, the hydraulic pressure control device PC enters the state illustrated in FIG. 17.

In the electric power interruption state, as illustrated in FIG. 8, the first instructed hydraulic pressure control valve S1 is not supplied with electric power (OFF) and opened and the second instructed hydraulic pressure control valve S2 is not supplied with electric power (OFF) and closed. This makes switching to the hydraulic passage 54 and the hydraulic passage 59 in the first hydraulic passage switching valve RLV1.

In addition, the transmission shift hydraulic pressure control valves SLC1, SLC2, . . . are not supplied with electric power and the first transmission shift hydraulic pressure control valve SLC1 and the fourth transmission shift hydraulic pressure control valve SLB1, which are of normal close type, are closed and do not output the hydraulic pressure of the hydraulic pressure source while the second transmission shift hydraulic pressure control valve SLC2 and the third transmission shift hydraulic pressure control valve SLC3, which are of normal open type, are opened and output the hydraulic pressure of the hydraulic pressure source.

Accordingly, the forward range pressure PD supplied to the input port of the hydraulic passage 54 of the first hydraulic passage switching valve RLV1 before the electric power interruption is supplied to the first clutch C1 via the hydraulic passage 54 of the first hydraulic passage switching valve RLV1 and the first clutch C1 is engaged as before the electric power interruption. In addition, the output hydraulic pressure of the third transmission shift hydraulic pressure control valve SLC3 is supplied to the third clutch C3 and the third clutch C3 is engaged. Accordingly, when an electric power interruption occurs in the engaged neutral state, the engagement of the first clutch C1 and the third clutch C3 forms the third stage (3rd).

In the electric power interruption state, although the output hydraulic pressure of the second instructed hydraulic pressure control valve S2 is not supplied as the second instructed hydraulic pressure of the fifth hydraulic passage switching valve RLV5, the forward range pressure PD supplied to the first clutch C1 is supplied as the third instructed hydraulic pressure of the fifth hydraulic passage switching valve RLV5 instead to maintain the state in which the hydraulic passage 77 is selected in the fifth hydraulic passage switching valve RLV5. Note that switching from the second instructed hydraulic pressure to the third instructed hydraulic pressure is performed smoothly by an accumulator attached to the first output hydraulic passage 53 of the fifth hydraulic passage switching valve RLV5 or the hydraulic passage 80.

Accordingly, even in the released neutral state in which all engagement devices C1, B1, . . . are released, by supplying the output hydraulic pressure of the first instructed hydraulic pressure control valve S1 as the second instructed hydraulic pressure of the fifth hydraulic passage switching valve RLV5, it is possible to form the third stage, which is one of high transmission shift ratio stages concerning the released neutral state, during occurrence of a hydraulic control fail (electric power interruption).

Other Embodiments

Finally, other embodiments of the disclosure will be described. Incidentally, the configurations of respective embodiments described below are not limited to those respectively applied alone, but as long as no conflict arises, can be applied in combination with the configuration of other embodiments.

(1) The above embodiment uses an example in which the transmission apparatus TM is drivably coupled to rear wheels and the rotary electric machine MG is drivably coupled to front wheels. However, embodiments of the disclosure are not limited to this embodiment. That is, the transmission apparatus TM may be drivably coupled to the front wheels and the rotary electric machine MG may be drivably coupled to the rear wheels. Alternatively, the rotary electric machine MG may be drivably coupled to the front wheels or the rear wheels to which the transmission apparatus TM is drivably coupled. In this case, preferably, the rotary electric machine MG is drivably coupled to any of rotary members forming the power transmission path between the output gear O of the transmission apparatus TM and the wheels W.

(2) The above embodiment uses an example in which the internal combustion engine ENG is drivably coupled to the input shaft I of the transmission apparatus TM as the first driving force source. However, embodiments of the disclosure are not limited to this embodiment. That is, the internal combustion engine ENG and the rotary electric machine may be drivably coupled to the input shaft I of the transmission apparatus TM as the first driving force source or the rotary electric machine may be drivably coupled as the first driving force instead of the internal combustion engine ENG. In these cases, the second driving force source may not be provided.

(3) The above embodiment uses an example in which the first driving force source (the internal combustion engine ENG) drivably coupled to the wheels W via the transmission apparatus TM is provided and the second driving force source (the rotary electric machine MG) drivably coupled to the wheels W by bypassing the transmission apparatus TM is provided. However, embodiments of the disclosure are not limited to this embodiment. That is, the structure in which the first driving force source is provided and the second driving force source is not provided is allowed.

(4) The first state determination method according to the above embodiment uses an example in which the neutral travel control portion 44 determines switching to the released neutral state when the determination result indicates the high transmission shift ratio stages or the neutral travel control portion 44 determines switching to the engaged neutral state when the determination result indicates the low transmission shift ratio stages. However, embodiments of the disclosure are not limited to this embodiment. That is, the neutral travel control portion 44 may determine switching to the released neutral state when the determination result indicates the low transmission shift ratio stages or the neutral travel control portion 44 may determine switching to the engaged neutral state when the determination result indicates the high transmission shift ratio stages. In this case, the particular transmission shift stage is preferably the engagement device (the first clutch C1 in the above example) engaged in common in a plurality of return time transmission shift stages determined to be high transmission shift ratio stages. In addition, the output hydraulic pressure of the second instructed hydraulic pressure control valve S2 is supplied to the side (the side opposite to that in the above embodiment) the same as that to which the supplied pressure for the second clutch C2 is supplied as the second instructed hydraulic pressure in the fifth hydraulic passage switching valve RLV5.

(5) The second state determination method according to the above embodiment uses an example in which the neutral travel control portion 44 determines switching to the released neutral state when the determination result indicates the low vehicle speed range and the high transmission shift ratio stages or the neutral travel control portion 44 determines switching to the engaged neutral state in the case other than switching to the released neutral state. However, embodiments of the disclosure are not limited to this embodiment. That is, the neutral travel control portion 44 may determine switching to the released neutral state when the determination result indicates the high vehicle speed range and the low transmission shift ratio stage and the neutral travel control portion 44 may determine switching to the engaged neutral state in the case other than switching to the released neutral state. In this case, the particular transmission shift stage is preferably the engagement device (the first clutch C1 in the above example) engaged in common in a plurality of return time transmission shift stages determined to be high transmission shift ratio stages. In addition, the output hydraulic pressure of the second instructed hydraulic pressure control valve S2 is supplied to the side (the side opposite to that in the above embodiment) the same as that to which the supplied pressure for the second clutch C2 is supplied as the second instructed hydraulic pressure in the fifth hydraulic passage switching valve RLV5.

Figure 18:
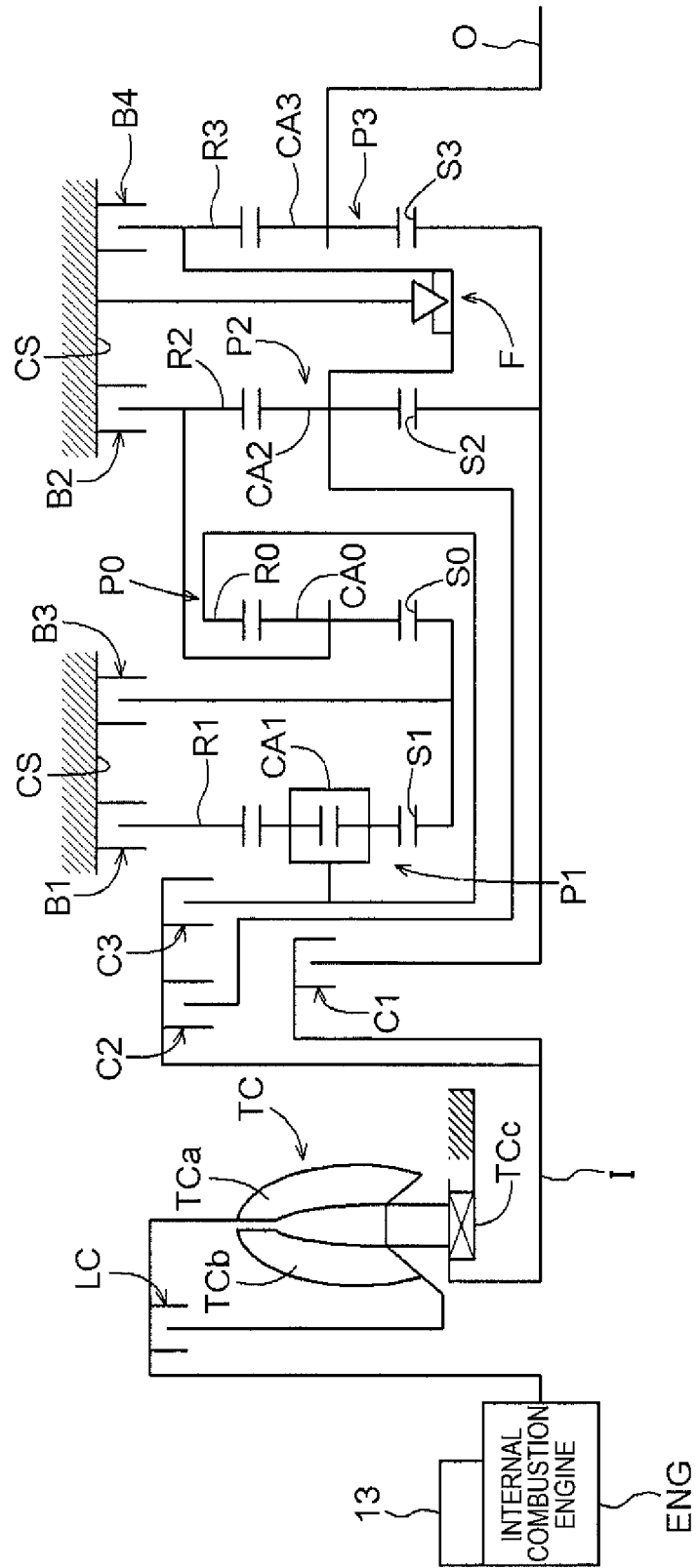
FIG. 18 is a skeleton view illustrating a vehicle driving device according to another embodiment of the disclosure.

(6) The above embodiment uses an example in which the transmission apparatus TM has transmission shift stages formed by engaging two engagement devices as illustrated in FIG. 4. However, embodiments of the disclosure are not limited to this embodiment. That is, the transmission apparatus TM may form transmission shift stages by engaging two or more engagement devices or one engagement device. For example, the transmission apparatus TM illustrated in FIGS. 18 and 19 is allowed. Specifically, the transmission apparatus TM has eight transmission shift stages having different transmission shift ratios as forward stages: the first stage (1st), the second stage, (2nd), the third stage (3rd), the fourth stage (4th), the fifth stage (5th), the sixth stage (6th), the seventh stage (7th), and eighth stage (8th)). The transmission apparatus TM has a gear mechanism including a zeroth planetary gear device P0, the first planetary gear device P1, the second planetary gear device P2, and a third planetary gear device P3 and the eight engagement devices C1, C2, C3, B1, B2, B3, B4, and F to form these transmission shift stages. Switching between the eight transmission shift stages can be performed by controlling the engagement and release of the plurality of engagement devices C1, B1, . . . except the one-way clutch F, performing switching the rotation states between the rotary elements of the planetary gear devices, and selectively engaging any three of the plurality of engagement devices C1, B1, . . . . Note that the transmission apparatus TM has two reverse transmission shift stages (the first reverse stage (Rev1) and the second reverse stage (Rev2)) in addition to the above eight transmission shift stages. Also in the transmission apparatus TM, in the engagement state, the neutral travel control portion 44 puts one or two particular engagement devices of the plurality of engagement devices C1, B1, . . . in the engaged neutral state and, in the released neutral state, puts all of the plurality of engagement devices C1, B1, . . . in the released state.

(7) The above embodiment uses an example in which the torque converter TC is provided between the internal combustion engine ENG and the transmission apparatus TM. However, embodiments of the disclosure are not limited to this embodiment. That is, the torque converter TC may not be provided between the internal combustion engine ENG and the transmission apparatus TM or a clutch may be provided instead of the torque converter TC between the internal combustion engine ENG and the transmission apparatus TM.

(8) The above embodiment uses an example in which the linear solenoid valves SLC1, SLB1, . . . are provided as actuators for controlling the engagement and release of the engagement devices C1, B1, . . . of the transmission apparatus TM and signal values supplied to the actuators are current values. However, embodiments of the disclosure are not limited to this embodiment. That is, an actuator other than a linear solenoid valve (such as, for example, a duty solenoid valve) may be provided and a signal value other than a current value (for example, a duty signal value having a variable duty ratio for turning on or off the solenoid valve) may be used.

In addition, the engagement devices C1, B1, . . . of the transmission apparatus TM may be engagement devices other than friction engagement devices, such as a meshing clutch (dog clutch).

In addition, the engagement devices C1, B1, . . . of the transmission apparatus TM may be controlled by a driving force (such as, for example, the driving force of an electromagnet or the driving force of a servo motor) other than a hydraulic pressure and electromagnets, motors, or the like may be used as actuators.

(9) The above embodiment uses an example in which the control device 30 has the plurality of control units 32 to 34 and the plurality of functional portions 41 to 46 are allocated to the plurality of control units 32 to 34. However, embodiments of the disclosure are not limited to this embodiment. That is, the control device 30 may include the plurality of control units 32 to 34 described above as an integrated control device in any combination or as separated control devices and the allocation of the plurality of functional portions 41 to 46 may be determined arbitrarily.

(10) The above embodiment uses an example in which the second instructed hydraulic pressure control valve S2 is also used as the hydraulic pressure control valve according to the disclosure. However, embodiments of the disclosure are not limited to this embodiment. A new hydraulic pressure control valve other than the second instructed hydraulic pressure control valve S2 may be provided and the new hydraulic pressure control valve may be used as the hydraulic pressure control valve according to the disclosure.

INDUSTRIAL APPLICABILITY

The disclosure is preferably applicable to a control device for controlling a vehicle driving device provided with a transmission apparatus including a plurality of engagement devices in a power transmission path between a driving force source and wheels and selectively forming a plurality of transmission shift stages having different transmission shift ratios depending on engagement states of the plurality of engagement devices.

The invention claimed is:

1. A control device for controlling a vehicle driving device provided with a transmission apparatus including a plurality of engagement devices in a power transmission path between a driving force source and a wheel and selectively forming a plurality of transmission shift stages having different transmission shift ratios depending on engagement states of the plurality of engagement devices, the control device comprising:
an electronic control unit that is configured to perform neutral travel control that controls the transmission apparatus to enter a neutral state in which power is not transferred during rotation of the wheel, wherein:
the electronic control unit performs switching between an engaged neutral state in which a particular engagement device of the plurality of engagement devices is put in an engagement state and the transmission apparatus is put in a state in which power is not transferred and a released neutral state in which all of the plurality of engagement devices are put in a released state and the transmission apparatus is put in the state in which power is not transferred, based on at least a vehicle speed during the neutral travel control,
the vehicle driving device has the driving force source as a first driving force source and a rotary electric machine drivable coupled to the wheel by bypassing the transmission apparatus as a second driving force source,
the electronic control unit determines whether the vehicle speed is in a predetermined low vehicle speed range or a high vehicle speed range higher than the low vehicle speed range,
the electronic control unit determines whether a return time transmission shift stage is included in high transmission shift ratio stages, which are one or more predetermined transmission shift stages, or included in low transmission shift ratio stages, which are one or more transmission shift stages having transmission shift ratios lower than the high transmission shift ratio stages,
the engaged neutral state is entered at least when the vehicle speed is in the high vehicle speed range and the return time transmission shift stage is included in the low transmission shift ratio stages in a state in which the wheel is rotated using a driving force of the rotary electric machine without using a driving force of the first driving force source, and
the particular engagement device is an engagement device engaged in common in a plurality of return time transmission shift stages determined to be the low transmission shift ratio stages.

2. The control device for a vehicle driving device according to claim 1,
wherein the electronic control unit performs switching between the engaged neutral state and the released neutral state based on the return time transmission shift stage determined based on at least the vehicle speed as a transmission shift stage formed during returning from the neutral state to a normal transmission shift state at present time in which the transmission apparatus forms the transmission shift stage.

3. The control device for a vehicle driving device according to claim 2, further comprising:
a hydraulic pressure controller controlling hydraulic pressures supplied to the plurality of engagement devices, and
a fail use hydraulic passage switching valve switching the engagement device to which the hydraulic pressure of the hydraulic pressure source is supplied during occurrence of a hydraulic control fail disabling the hydraulic pressure controller from functioning normally,
wherein the fail use hydraulic passage switching valve performs switching between hydraulic passages so that the hydraulic pressure of the hydraulic pressure source is supplied to the particular engagement device during occurrence of the hydraulic control fail by receiving the hydraulic pressure supplied to the particular engagement device in the engaged neutral state as a first instructed hydraulic pressure.

4. The control device for a vehicle driving device according to claim 3, further comprising:
a hydraulic pressure control valve controlling a hydraulic pressure supplied to the fail use hydraulic passage switching valve as a second instructed hydraulic pressure,
wherein the electronic control unit controls the hydraulic pressure control valve in the released neutral state to supply the second instructed hydraulic pressure to the fail use hydraulic passage switching valve, and
the fail use hydraulic passage switching valve switches the hydraulic passage so that the hydraulic pressure of the hydraulic pressure source is supplied to an engagement device other than the particular engagement device during occurrence of the hydraulic control fail by receiving the second instructed hydraulic pressure from the hydraulic pressure control valve.

5. The control device for a vehicle driving device according to claim 2, further comprising:
a hydraulic pressure controller controlling hydraulic pressures supplied to the plurality of engagement devices,
a fail use hydraulic passage switching valve switching the engagement device to which the hydraulic pressure of the hydraulic pressure source is supplied during occurrence of the hydraulic control fail disabling the hydraulic pressure controller from functioning normally, and
a hydraulic pressure control valve controlling a hydraulic pressure supplied to the fail use hydraulic passage switching valve as a second instructed hydraulic pressure,
wherein the electronic control unit controls the hydraulic pressure control valve in the released neutral state to supply the second instructed hydraulic pressure to the fail use hydraulic passage switching valve, and
the fail use hydraulic passage switching valve switches the hydraulic passage so that the hydraulic pressure of the hydraulic pressure source is supplied to an engagement device other than the particular engagement device during occurrence of the hydraulic control fail by receiving the second instructed hydraulic pressure from the hydraulic pressure control valve.

6. The control device for a vehicle driving device according to claim 2,
wherein the electronic control unit determines whether the return time transmission shift stage is included in high transmission shift ratio stages, which are one or more predetermined transmission shift stages, or included in low transmission shift ratio stages, which are one or more transmission shift stages having transmission shift ratios lower than the high transmission shift ratio stages,
the released neutral state is entered when the vehicle speed is in the low vehicle speed range and the return time transmission shift stage is included in the high transmission shift ratio stages or when the vehicle speed is in the high vehicle speed range and the return time transmission shift stage is included in the low transmission shift ratio stages, and
the engaged neutral state is entered unless the released neutral state is entered.

7. The control device for a vehicle driving device according to claim 6, further comprising:
a hydraulic pressure controller controlling hydraulic pressures supplied to the plurality of engagement devices, and
a fail use hydraulic passage switching valve switching the engagement device to which the hydraulic pressure of the hydraulic pressure source is supplied during occurrence of a hydraulic control fail disabling the hydraulic pressure controller from functioning normally,
wherein the fail use hydraulic passage switching valve performs switching between hydraulic passages so that the hydraulic pressure of the hydraulic pressure source is supplied to the particular engagement device during occurrence of the hydraulic control fail by receiving the hydraulic pressure supplied to the particular engagement device in the engaged neutral state as a first instructed hydraulic pressure.

8. The control device for a vehicle driving device according to claim 6, further comprising:
a hydraulic pressure controller controlling hydraulic pressures supplied to the plurality of engagement devices,
a fail use hydraulic passage switching valve switching the engagement device to which the hydraulic pressure of the hydraulic pressure source is supplied during occurrence of the hydraulic control fail disabling the hydraulic pressure controller from functioning normally, and
a hydraulic pressure control valve controlling a hydraulic pressure supplied to the fail use hydraulic passage switching valve as a second instructed hydraulic pressure,
wherein the electronic control unit controls the hydraulic pressure control valve in the released neutral state to supply the second instructed hydraulic pressure to the fail use hydraulic passage switching valve, and
the fail use hydraulic passage switching valve switches the hydraulic passage so that the hydraulic pressure of the hydraulic pressure source is supplied to an engagement device other than the particular engagement device during occurrence of the hydraulic control fail by receiving the second instructed hydraulic pressure from the hydraulic pressure control valve.

9. The control device for a vehicle driving device according to claim 6,
wherein the particular engagement device is an engagement device engaged in common in either: (1) a plurality of the return time transmission shift stages determined to be the low transmission shift ratio stages or (2) a plurality of the return time transmission shift stages determined to be the high transmission shift ratio stages.

10. The control device for a vehicle driving device according to claim 9, further comprising:

a hydraulic pressure controller controlling hydraulic pressures supplied to the plurality of engagement devices, and a fail use hydraulic passage switching valve switching the engagement device to which the hydraulic pressure of the hydraulic pressure source is supplied during occurrence of a hydraulic control fail disabling the hydraulic pressure controller from functioning normally, wherein the fail use hydraulic passage switching valve performs switching between hydraulic passages so that the hydraulic pressure of the hydraulic pressure source is supplied to the particular engagement device during occurrence of the hydraulic control fail by receiving the hydraulic pressure supplied to the particular engagement device in the engaged neutral state as a first instructed hydraulic pressure.

11. The control device for a vehicle driving device according to claim 9, further comprising:

a hydraulic pressure controller controlling hydraulic pressures supplied to the plurality of engagement devices, a fail use hydraulic passage switching valve switching the engagement device to which the hydraulic pressure of the hydraulic pressure source is supplied during occurrence of the hydraulic control fail disabling the hydraulic pressure controller from functioning normally, and a hydraulic pressure control valve controlling a hydraulic pressure supplied to the fail use hydraulic passage switching valve as a second instructed hydraulic pressure, wherein the electronic control unit controls the hydraulic pressure control valve in the released neutral state to supply the second instructed hydraulic pressure to the fail use hydraulic passage switching valve, and the fail use hydraulic passage switching valve switches the hydraulic passage so that the hydraulic pressure of the hydraulic pressure source is supplied to an engagement device other than the particular engagement device during occurrence of the hydraulic control fail by receiving the second instructed hydraulic pressure from the hydraulic pressure control valve.

12. The control device for a vehicle driving device according to claim 1, further comprising:

a hydraulic pressure controller controlling hydraulic pressures supplied to the plurality of engagement devices, and a fail use hydraulic passage switching valve switching the engagement device to which the hydraulic pressure of the hydraulic pressure source is supplied during occurrence of a hydraulic control fail disabling the hydraulic pressure controller from functioning normally, wherein the fail use hydraulic passage switching valve performs switching between hydraulic passages so that the hydraulic pressure of the hydraulic pressure source is supplied to the particular engagement device during occurrence of the hydraulic control fail by receiving the hydraulic pressure supplied to the particular engagement device in the engaged neutral state as a first instructed hydraulic pressure.

13. The control device for a vehicle driving device according to claim 12, further comprising:

a hydraulic pressure control valve controlling a hydraulic pressure supplied to the fail use hydraulic passage switching valve as a second instructed hydraulic pressure, wherein the electronic control unit controls the hydraulic pressure control valve in the released neutral state to supply the second instructed hydraulic pressure to the fail use hydraulic passage switching valve, and the fail use hydraulic passage switching valve switches the hydraulic passage so that the hydraulic pressure of the hydraulic pressure source is supplied to an engagement device other than the particular engagement device during occurrence of the hydraulic control fail by receiving the second instructed hydraulic pressure from the hydraulic pressure control valve.

14. The control device for a vehicle driving device according to claim 1, further comprising:

a hydraulic pressure controller controlling hydraulic pressures supplied to the plurality of engagement devices, a fail use hydraulic passage switching valve switching the engagement device to which the hydraulic pressure of the hydraulic pressure source is supplied during occurrence of the hydraulic control fail disabling the hydraulic pressure controller from functioning normally, and a hydraulic pressure control valve controlling a hydraulic pressure supplied to the fail use hydraulic passage switching valve as a second instructed hydraulic pressure, wherein the electronic control unit controls the hydraulic pressure control valve in the released neutral state to supply the second instructed hydraulic pressure to the fail use hydraulic passage switching valve, and the fail use hydraulic passage switching valve switches the hydraulic passage so that the hydraulic pressure of the hydraulic pressure source is supplied to an engagement device other than the particular engagement device during occurrence of the hydraulic control fail by receiving the second instructed hydraulic pressure from the hydraulic pressure control valve.

* * * * *